United States Patent
Gittleman

(10) Patent No.: US 10,325,239 B2
(45) Date of Patent: Jun. 18, 2019

(54) SYSTEMS, METHODS, AND COMPUTER PROGRAM PRODUCTS FOR A SHIPPING APPLICATION HAVING AN AUTOMATED TRIGGER TERM TOOL

(71) Applicant: United Parcel Service of America, Inc., Atlanta, GA (US)

(72) Inventor: Lawrence Gittleman, Cumming, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 612 days.

(21) Appl. No.: 13/788,156

(22) Filed: Mar. 7, 2013

(65) Prior Publication Data

US 2014/0122368 A1 May 1, 2014

Related U.S. Application Data

(60) Provisional application No. 61/720,655, filed on Oct. 31, 2012.

(51) Int. Cl.
*G06Q 10/08* (2012.01)
(52) U.S. Cl.
CPC .............................. *G06Q 10/0832* (2013.01)
(58) Field of Classification Search
CPC ........... G06Q 10/0833; G06Q 10/0836; G06Q 10/083; G06Q 10/0835; G06Q 10/0838;
(Continued)

(56) References Cited

U.S. PATENT DOCUMENTS 5,924,094 A 7/1999 Sutter
6,128,617 A 10/2000 Lowry
(Continued)

OTHER PUBLICATIONS

Temple, James. "High-Speed Pursuits; Google Wants Internet to be Instantaneous, Which Would Attract More Users—Not to Mention Money." San Francisco Chronicle: D1. Oct. 3, 2010.Proquest. Web. Nov. 3, 2016.*

(Continued)

*Primary Examiner* — Michael P Harrington
(74) *Attorney, Agent, or Firm* — Shook, Hardy and Bacon, L.L.P.

(57) ABSTRACT

Various embodiments provide a shipping request system for dynamically identifying one or more restricted items within shipping requests. The system comprises: one or more memory storage areas containing data and one or more computer processors. The computer processors are configured to: receive input content data comprising one or more terms descriptive of one or more items for which shipment is requested, and retrieve trigger data from the one or more memory storage areas, the trigger data being associated with one or more terms related to one or more restrictions placed upon shipment of an item. The input content data is then dynamically compared against the trigger data to identify one or more correlations indicative of the presence of one or more restricted items. If correlations are identified, further shipment request processing is prevented; otherwise processing may continue. Associated computer program products and computer implemented methods are also provided.

23 Claims, 22 Drawing Sheets

(58) Field of Classification Search
CPC .. G06Q 10/087; G06Q 10/08; G06Q 10/0832; G06Q 10/08355
See application file for complete search history.

(56) References Cited

U.S. PATENT DOCUMENTS

| | | | |
|---|---|---|---|
| 6,341,287 | B1 | 1/2002 | Sziklai et al. |
| 6,397,115 | B1 | 5/2002 | Basden |
| 6,879,962 | B1 | 4/2005 | Smith et al. |
| 7,412,444 | B2 | 8/2008 | Gaponoff |
| 7,512,594 | B2 | 3/2009 | Zhang |
| 7,606,762 | B1 | 10/2009 | Heit |
| 8,255,411 | B1* | 8/2012 | Carpenter ........... G06F 17/3064 707/764 |
| 8,738,414 | B1 | 5/2014 | Nagar et al. |
| 9,195,939 | B1 | 11/2015 | Goyal et al. |
| 2002/0010665 | A1 | 1/2002 | Lefebvre et al. |
| 2002/0023057 | A1* | 2/2002 | Goodwin ............ G06Q 30/02 705/50 |
| 2002/0129017 | A1 | 9/2002 | Kil et al. |
| 2003/0115289 | A1 | 6/2003 | Chinn et al. |
| 2004/0015487 | A1 | 1/2004 | Lin et al. |
| 2004/0015488 | A1 | 1/2004 | Anonsen et al. |
| 2004/0030490 | A1 | 2/2004 | Hegedus et al. |
| 2005/0131843 | A1 | 6/2005 | Sansone et al. |
| 2006/0015469 | A1* | 1/2006 | Whitehouse .................. 705/410 |
| 2006/0106856 | A1 | 5/2006 | Bermender et al. |
| 2006/0224613 | A1 | 10/2006 | Bermender et al. |
| 2007/0073734 | A1 | 3/2007 | Doan et al. |
| 2007/0234202 | A1 | 10/2007 | Lyness |
| 2008/0228712 | A1* | 9/2008 | Nomura ........................ 707/3 |
| 2008/0294536 | A1* | 11/2008 | Taylor et al. ................... 705/28 |
| 2009/0282062 | A1 | 11/2009 | Husic |
| 2010/0153848 | A1 | 6/2010 | Saha |
| 2011/0066549 | A1 | 3/2011 | Whitehouse |
| 2012/0078805 | A1* | 3/2012 | Monz-Schneider et al. ................ 705/331 |
| 2012/0089631 | A1 | 4/2012 | Poon et al. |
| 2012/0130927 | A1 | 5/2012 | Shimogori |
| 2013/0275466 | A1 | 10/2013 | Xiao |
| 2013/0323476 | A1 | 12/2013 | Farrell et al. |
| 2014/0280363 | A1 | 9/2014 | Heng et al. |
| 2014/0379603 | A1 | 12/2014 | Bodenhamer et al. |
| 2015/0186447 | A1 | 7/2015 | Milousheff et al. |
| 2016/0092487 | A1 | 3/2016 | Upadhyaya et al. |
| 2016/0275447 | A1 | 9/2016 | Bennett et al. |
| 2016/0275448 | A1 | 9/2016 | Bennett et al. |
| 2016/0283526 | A1 | 9/2016 | Shmueli et al. |

OTHER PUBLICATIONS

CSX Corporation, "ShipCSX eBusiness", Oct. 19, 2006 to Dec. 25, 2010, Internet Archive <https://shipcsx.com/public/shipcsx/WebHelp/si-csxi/SI_CSXI_HazMat_Details.htm>, 5 pages.
FedEx, "FedEx Ship Manager Software Help Guide", Jan. 2011, retrieved from <http://www.fedex.com/us/software/pdf/FedEx_Ship_Manager_Software_Help_Guide_%28Dangerous_Goods_Hazardous_Materials%29_Jan_2011_12072010.pdf>, on Feb. 16, 2016, 18 pages.
Anonymous, "Computer Network," *Wikipedia, the free encyclopedia*, Jan. 31, 2010, retrieved from <http://en.wikipedia.org/w/index.php?title=Computernetwork&oldid.341100015> on May 12, 2014.
Office Action received for European Patent Application No. 16702279.7, dated Jul. 3, 2018, 6 pages.
Non Final Office Action received for U.S. Appl. No. 14/931,218, dated Sep. 21, 2018, 16 pages.
Non-Final Office Action received for U.S. Appl. No. 14/931,374, dated Mar. 1, 2019, 22 pages.

* cited by examiner

FIG. 16

Contents

Enter description of content*

Shirt, laptop, cashmere sweater,

*If it's changed to a "non-trigger" term, the related warning will disappear*

Review prohibited/restricted items:

The entered description may indicate the presence of prohibited items.

Term or item: Laptop
Related category: Batteries
The shipping of batteries is regulated.
Click here if your package contains batteries of any kind.

*The customer's typing speed is measured, and the speed of the display update is adjusted accordingly*

Show all categories

☐ There are no prohibited items in this package
(Must be checked to continue)

This is a general guide to prohibited and restricted items, not a complete listing. If you're unsure if your package complies with regulations, please ask a Store Associate for assistance.

FIG. 18

Contents

Enter description of contents:

Shirt, laptop, cashmere sweater, nail polish

*This information can continue to be edited*

Review prohibited/restricted items:

Show warnings

- Alcoholic beverages 411 — More information
- Tobacco 412 — More information
- Exceptional value items 413 — More information
- Animals, skins and furs 414 — More information
- Perishable goods 415 — More information
- Dangerous goods 416 — More information
- Plants and seeds 417 — More information
- Money and negotiable items 418 — More information
- Firearms and ammunition 419 — More information ☐ There are no prohibited items in this package
(Must be checked to continue)

This is a general guide to prohibited and restricted items, not a complete listing. If you're unsure if your package complies with regulations, please ask a Store Associate for assistance.

SYSTEMS, METHODS, AND COMPUTER PROGRAM PRODUCTS FOR A SHIPPING APPLICATION HAVING AN AUTOMATED TRIGGER TERM TOOL

CROSS-REFERENCE TO RELATED APPLICATIONS

This application claims priority to and the benefit of U.S. Provisional Application No. 61/720,655, filed Oct. 31, 2012, the contents of which, including any appendices attached thereto, are hereby incorporated by reference in their entirety.

BACKGROUND

Various industry and legislatively-imposed regulations and security measures restrict and/or prohibit shipping and transporting certain articles via common carrier service providers. As a non-limiting example, in certain instances the restricted articles have been deemed dangerous, hazardous, or unsafe, thus requiring stricter scrutiny by common carrier service providers to ensure that such articles are not inadvertently passed through their carrier systems undetected. Liability exposure can oftentimes be significant, carrying civil penalties up $250-$50,000 per violation, increasable to $100,000 if injury occurs. Criminal penalties may also exist, up to $500,000 and/or five years imprisonment per violation.

Still further, at least the Federal Aviation Association (FAA) and other comparable regulatory bodies have indicated planned implementation of auditing procedures of common carrier service providers. Certain audits may involve introducing purposely prepared non-compliant hazardous material packages as a test of common carrier training and procedures. Inconsistent and/or inadvertent acceptance of such non-compliant "audit" packages would lead to further scrutiny and/or one or more penalties such as or in addition to those previously mentioned.

Thus, a need exists for a simplistic tool that ensures consistent, efficient, and accurate identification of restricted and/or prohibited items as part of processing a customer shipping request, without hindering pre-existing customer conveniences and interfaces.

BRIEF SUMMARY

According to various embodiments of the present invention, a shipping request system is provided for dynamically identifying one or more restricted items within shipping requests for transport of one or more packages via a common carrier service provider. The system comprises: one or more memory storage areas containing restricted content data associated with one or more restrictions placed upon contents of package shipments handled by the common carrier service provider, and trigger data associated with one or more terms related to the one or more restrictions; and one or more computer processors. The one or more computer processors are configured to: receive input content data comprising one or more terms descriptive of one or more items for which shipment is requested via the common carrier service provider; retrieve the trigger data from the one or more memory storage areas; dynamically compare the input content data against the retrieved trigger data to identify one or more correlations there-between, the one or more correlations being indicative of the presence of one or more restricted items; in response to identifying one or more correlations, prevent further processing of the shipment request; and in response to not identifying one or more correlations, facilitate further processing of the shipment request.

In certain embodiments of the system, in response to identifying one or more correlations, the one or more computer processors are further configured to generate one or more notifications thereof. In at least one embodiment of the system, the one or more notifications further comprise a display of information related to one or more categories associated with the one or more restricted items indicated by the one or more correlations.

In other embodiments of the system, in response to identifying one or more correlations, the one or more computer processors are configured to generate a display of information related to one or more categories associated with the one or more correlations, the display of information comprising at least a portion of the restricted content data. In at least one embodiment of the system, the generated display is automatically updated in a dynamic fashion corresponding to the dynamic comparison of the input content data and the retrieved trigger data.

In still other embodiments of the system, the one or more computer processors are configured to prevent further processing of the shipment request until input content data has been received and the existence of no correlations has been confirmed by a user of the system.

According to various embodiments of the present invention, a non-transitory computer program product is provided comprising at least one computer-readable storage medium having computer-readable program code portions embodied therein. The computer-readable program code portions comprise: a first executable portion configured for receiving a plurality of data, wherein the data comprises: (i) restricted content data associated with one or more restrictions placed upon package shipments handled by a common carrier service provider; and (ii) trigger data associated with one or more terms related to the one or more restrictions. The computer-readable program code portions further comprise: (B) a second executable portion configured for dynamically comparing the input content data against the retrieved trigger data to identify one or more correlations there-between, the one or more correlations being indicative of the presence of one or more restricted items, the input content data comprising one or more terms descriptive of one or more items for which shipment is requested via the common carrier service provider; and (C) a third executable portion configured for: (i) in response to identifying one or more correlations, preventing further processing of the shipment request; and (ii) in response to not identifying one or more correlations, facilitating further processing of the shipment request.

In certain embodiments of the non-transitory computer program product the second executable portion is further configured for dynamically scrubbing the input content data against the retrieved trigger data on an individual keystroke basis; the second executable portion is further configured to dynamically generate and update a display of information related to the one or more identified correlations, based at least in part upon the individual keystroke scrubbing; and the third executable portion is further configured to dynamically generate one or more notifications in response to identifying the one or more correlations.

In certain embodiments of the non-transitory computer program product, the third executable portion is further configured for preventing further processing of the shipment request pending receipt of confirmation data, the confirmation data comprising at least one of an indication that no restricted items have been identified as existing within the one or more packages for which shipment via the common carrier service provider is requested and an indication that any identified restricted items have been removed from including within the one or more packages for which shipment via the common carrier service provider is requested. In at least one embodiments of the computer program product, the third executable portion is still further configured for preventing further processing of the shipment request until at least some portion of input content data has been received.

According to various embodiments of the present invention, a computer-implemented method is provided for dynamically identifying one or more restricted items within shipping requests for transport of one or more packages via a common carrier service provider. Various embodiments of the method comprise the steps of: receiving and storing within one or more memory storage areas trigger data associated with one or more terms related to one or more restrictions placed upon contents of package shipments handled by the common carrier service provider; receiving input content data comprising one or more terms descriptive of one or more items for which shipment is requested via the common carrier service provider; dynamically comparing, via at least one computer processor, the input content data against the retrieved trigger data to identify one or more correlations there-between, the one or more correlations being indicative of the presence of one or more restricted items; in response to identifying one or more correlations, prevent further processing of the shipment request; and in response to not identifying one or more correlations, facilitate further processing of the shipment request.

In certain embodiments, the computer-implemented method may further comprise the steps of: receiving and storing within one or more memory storage areas restricted content data associated with the one or more restrictions placed upon contents of package shipments handled by the common carrier service provider; and in response to identifying one or more correlations, generating a display providing to a user at least a portion of the restricted content data, the portion being that which is categorically associated with the one or more trigger terms for which the one or more correlations are identified. In at least one embodiment, the dynamic comparison of the input content data against the trigger data occurs on a keystroke-by-keystroke entry basis; and the generated display providing the user at least a portion of the restricted content data is dynamically updated based at least in part upon a corresponding update of the input content data on a keystroke-by-keystroke entry basis. In still other embodiments, the computer-implemented methods further comprises the step of facilitating further processing of the shipping request only upon receipt of input content data and at least one of a confirmation that at least one of no correlations were identified and a confirmation that any identified correlations have been resolved.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 2:
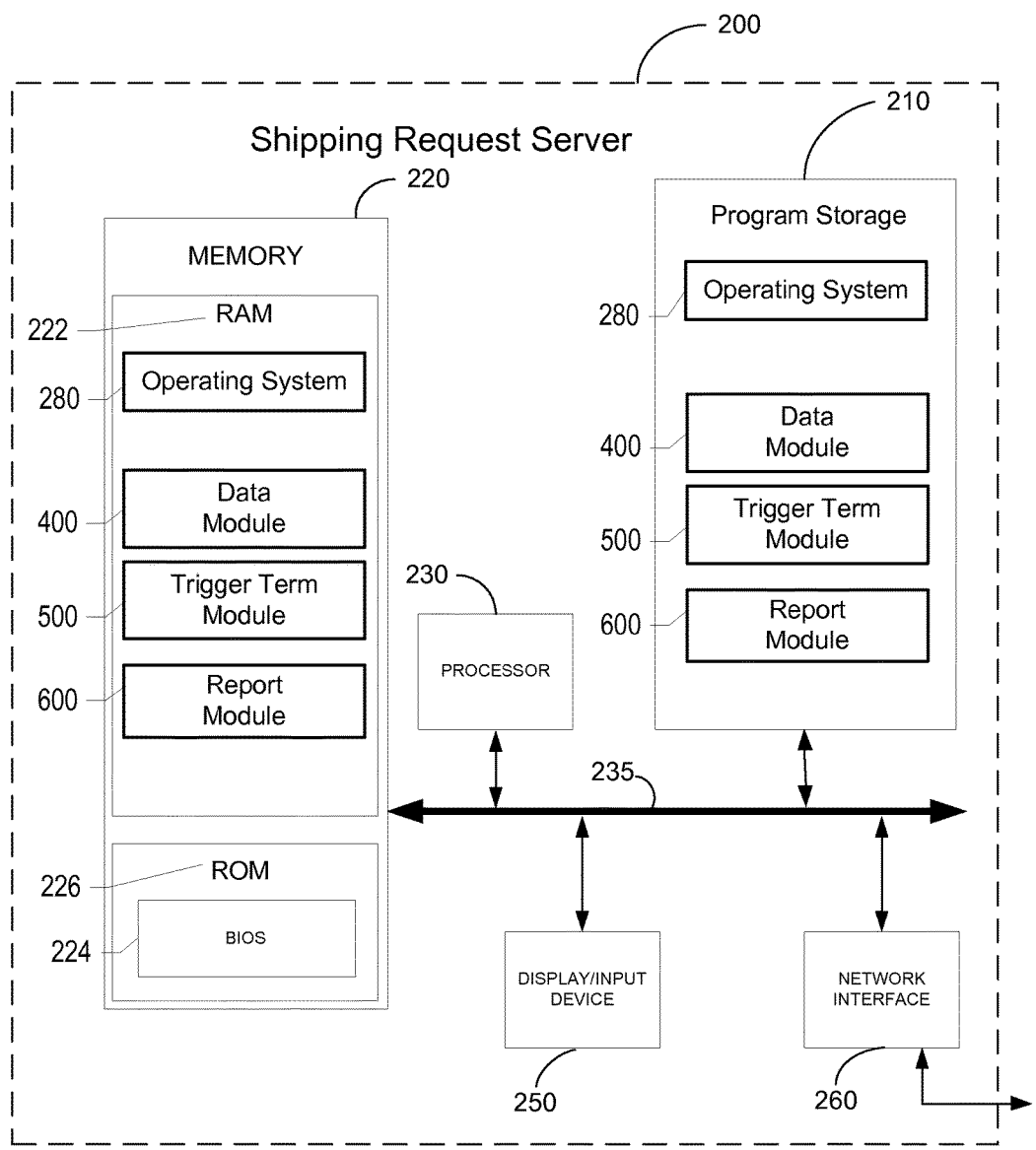
FIG. 2 is schematic block diagram of a shipping request server 200 according to various embodiments.
Figure 3:
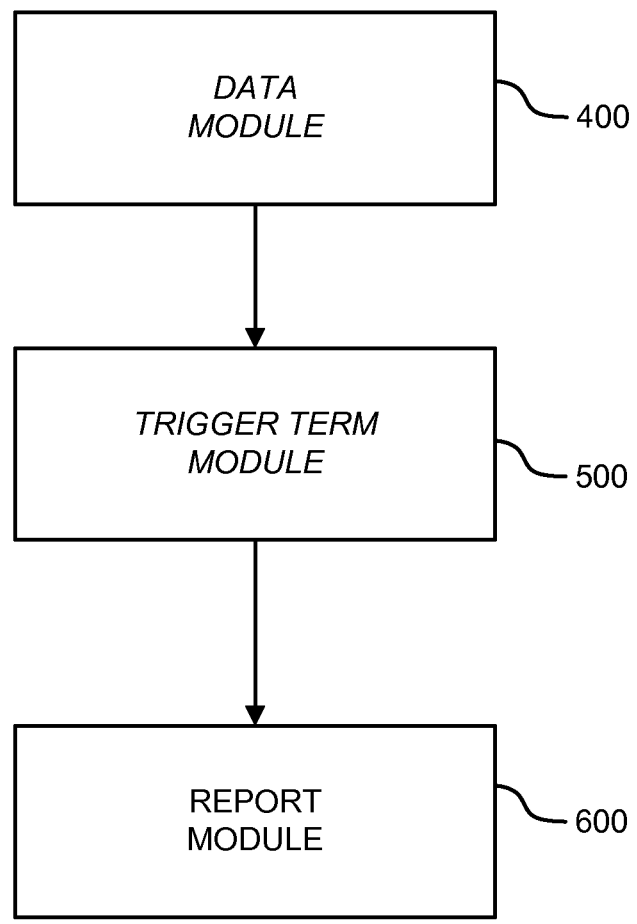
FIG. 3 illustrates an overall process flow for various modules of the shipping request server 200 according to various embodiments.
Figure 5:
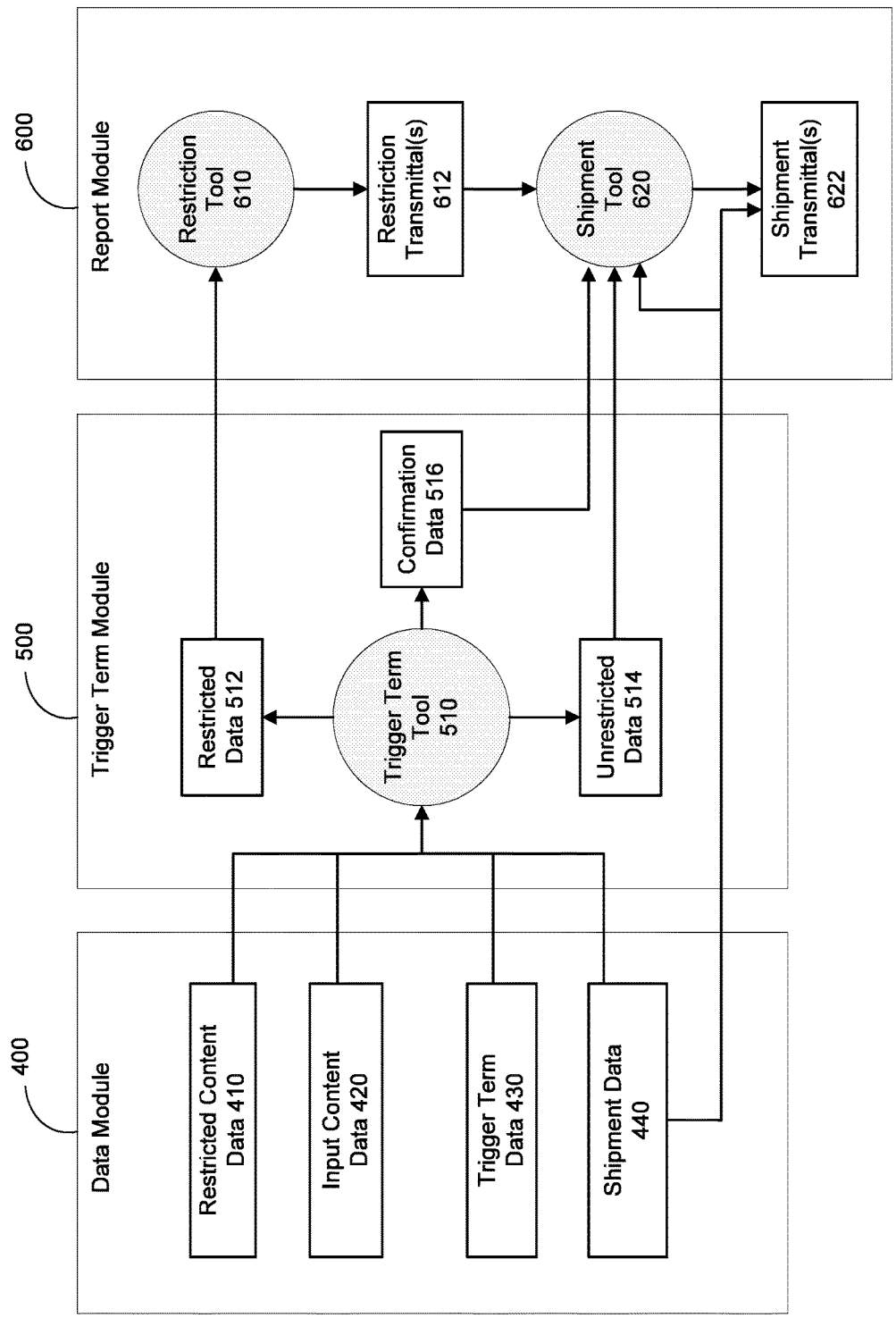
Figure 6:
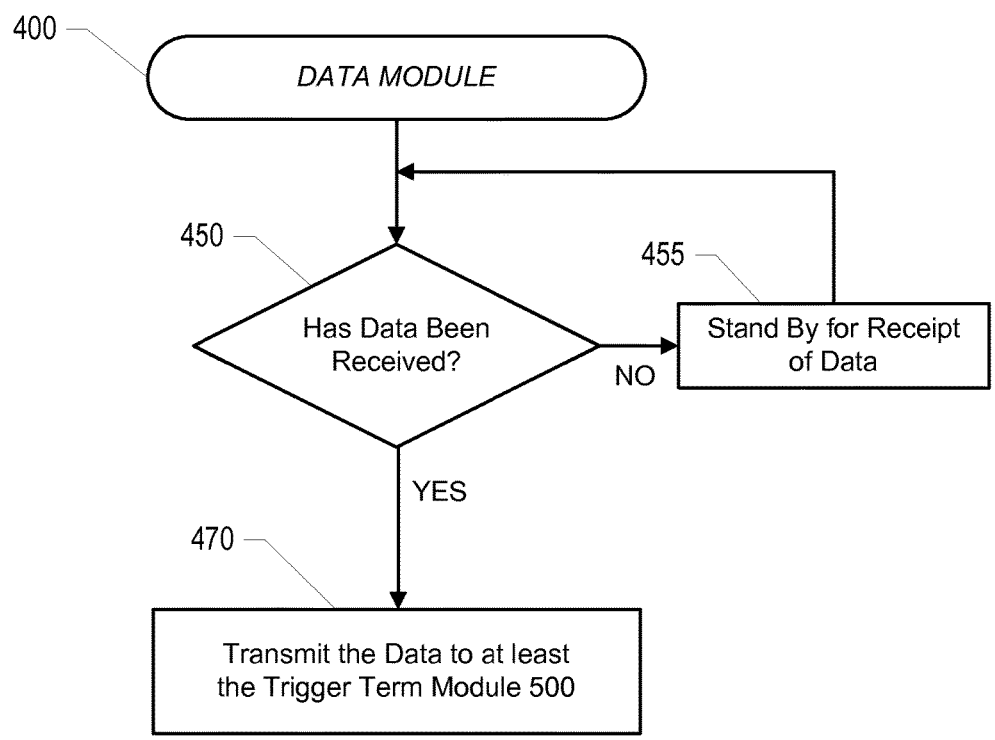
Figure 7:
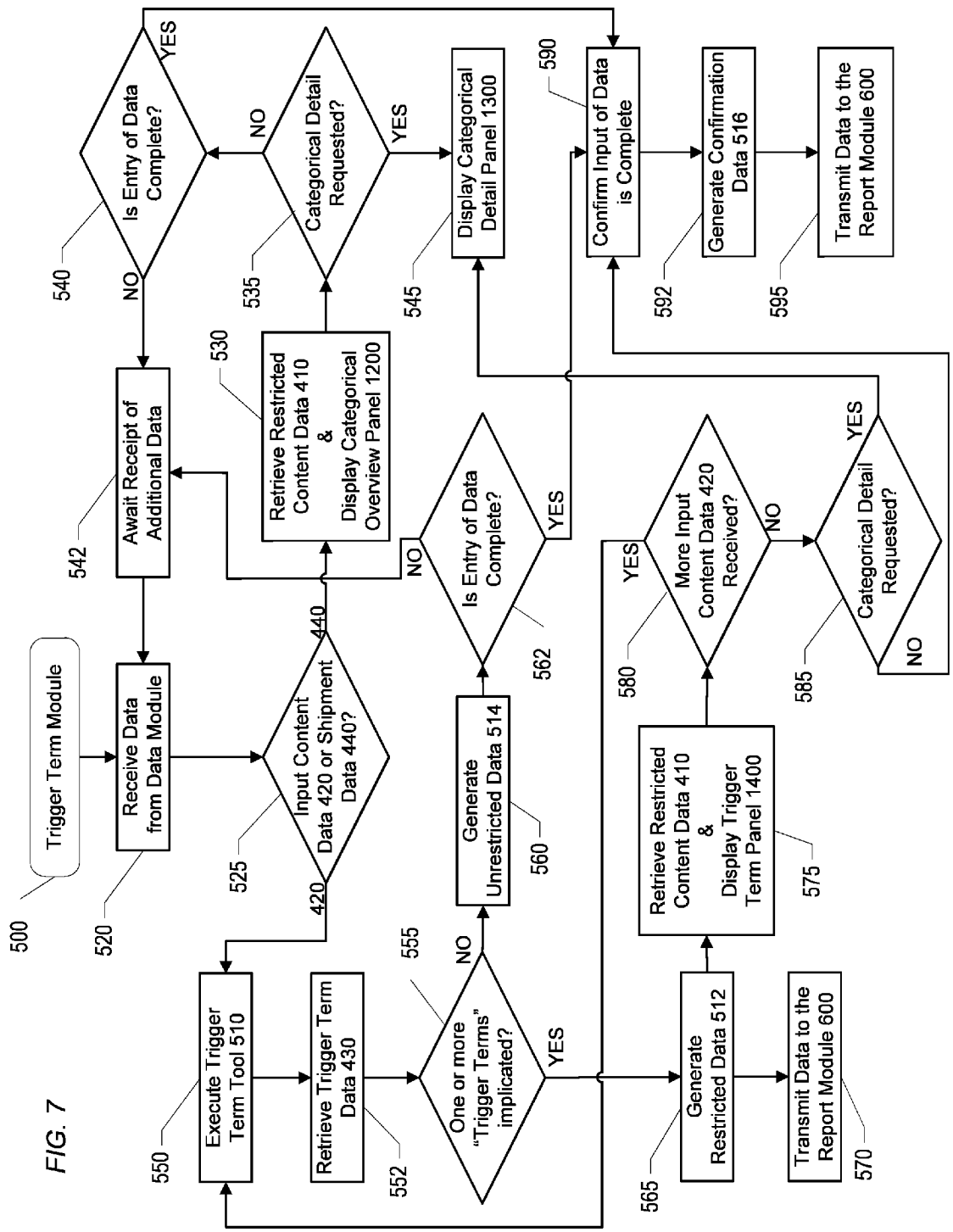
Figure 8:
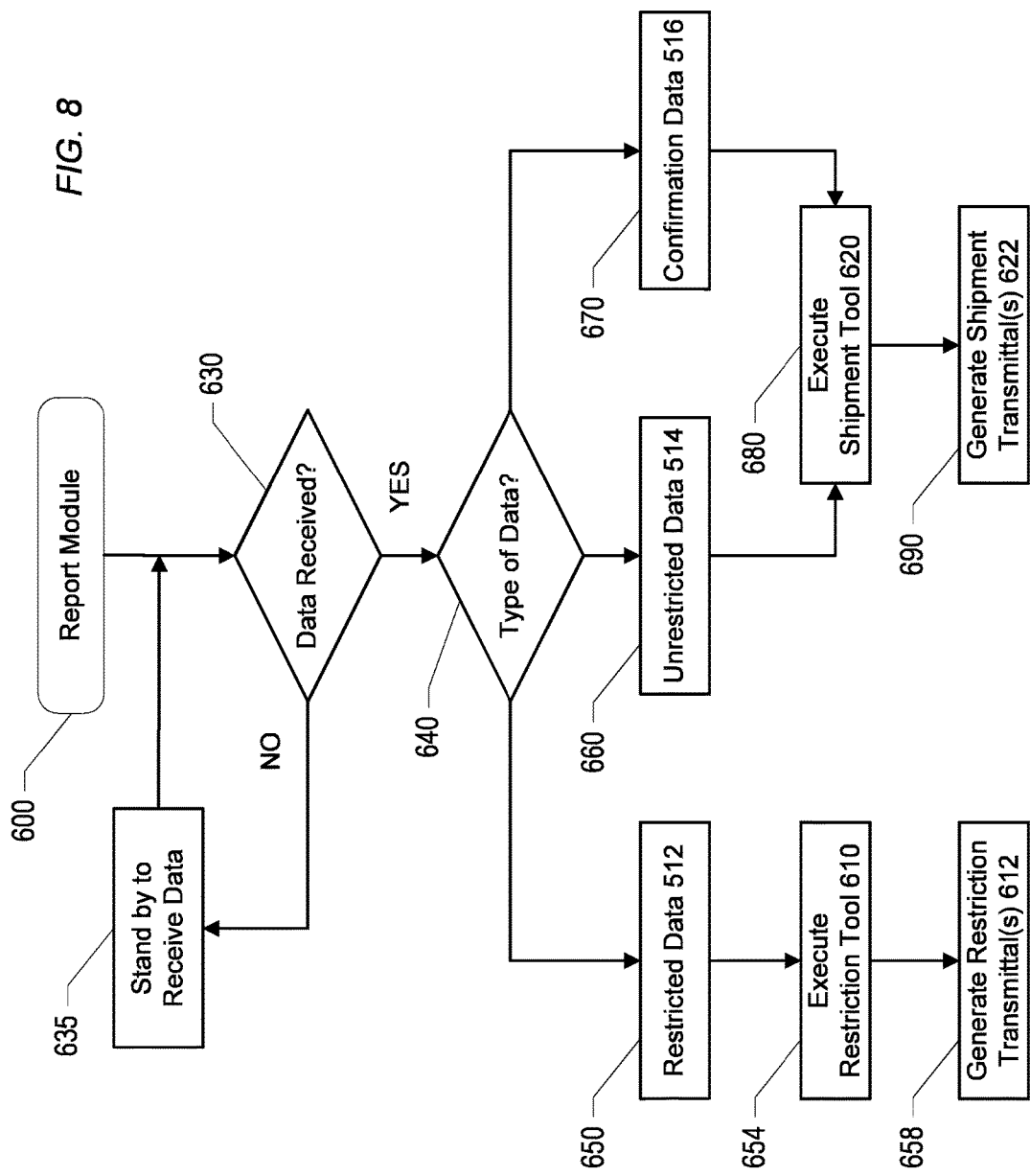
Figure 9:
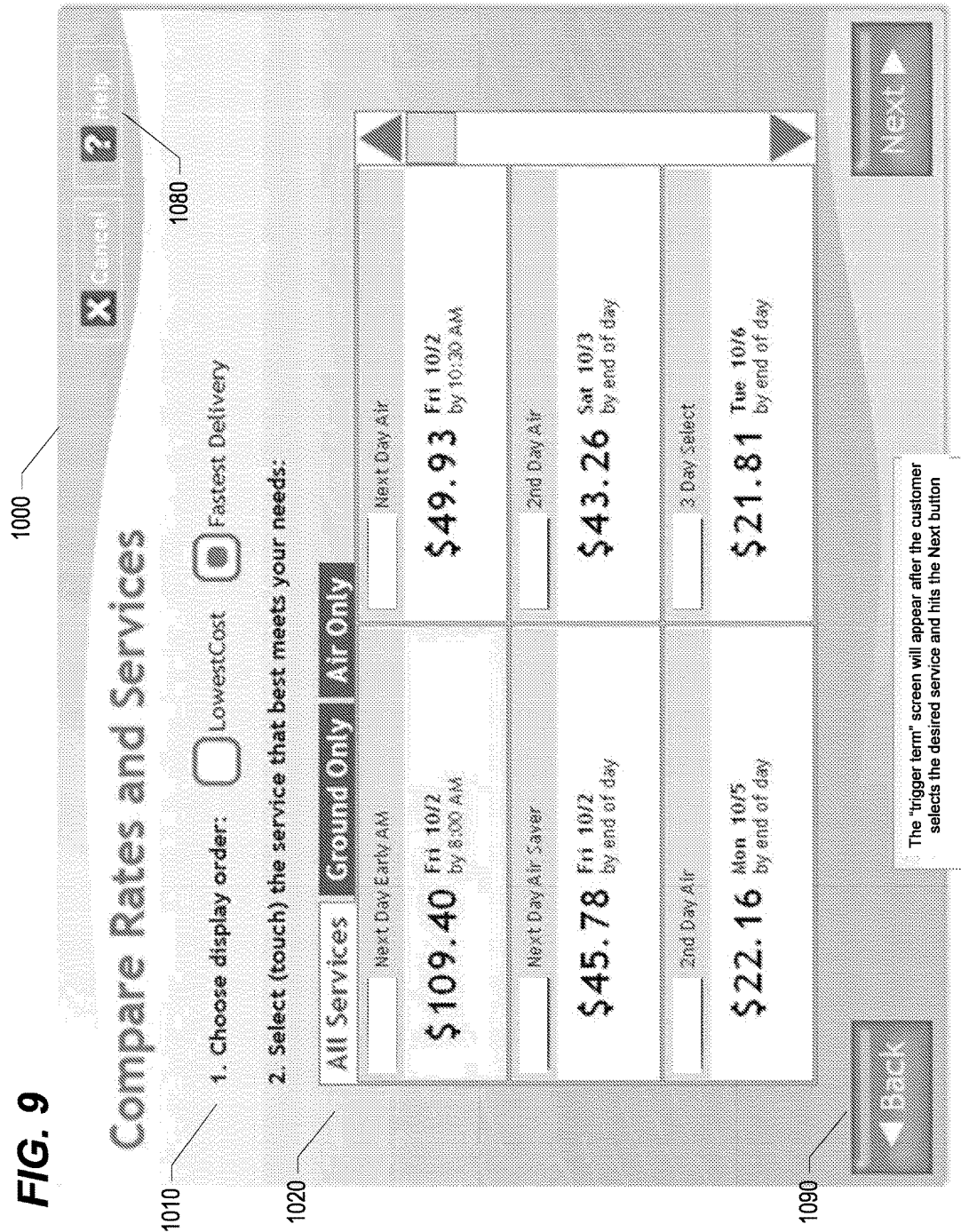
Figure 10:
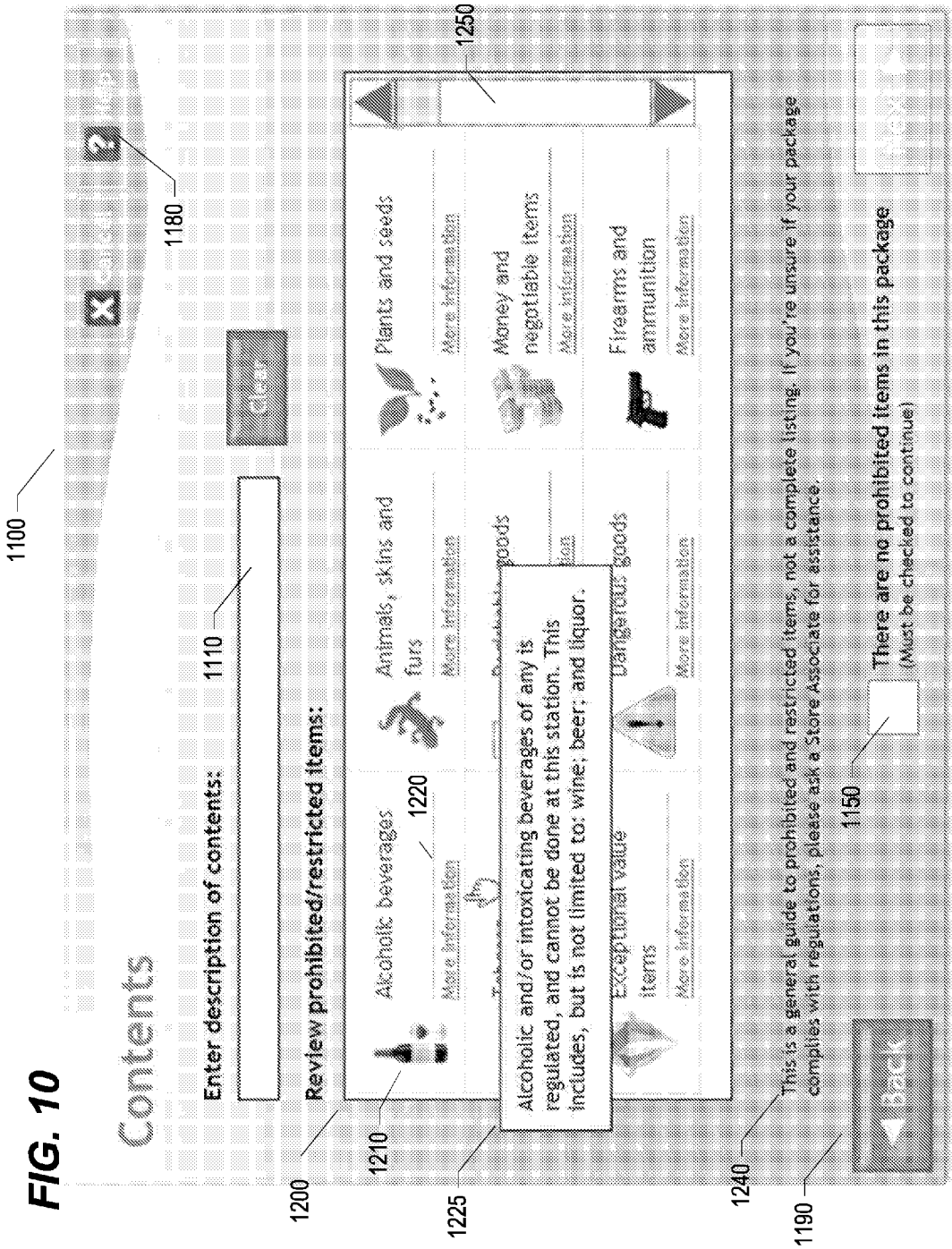
Figure 11:
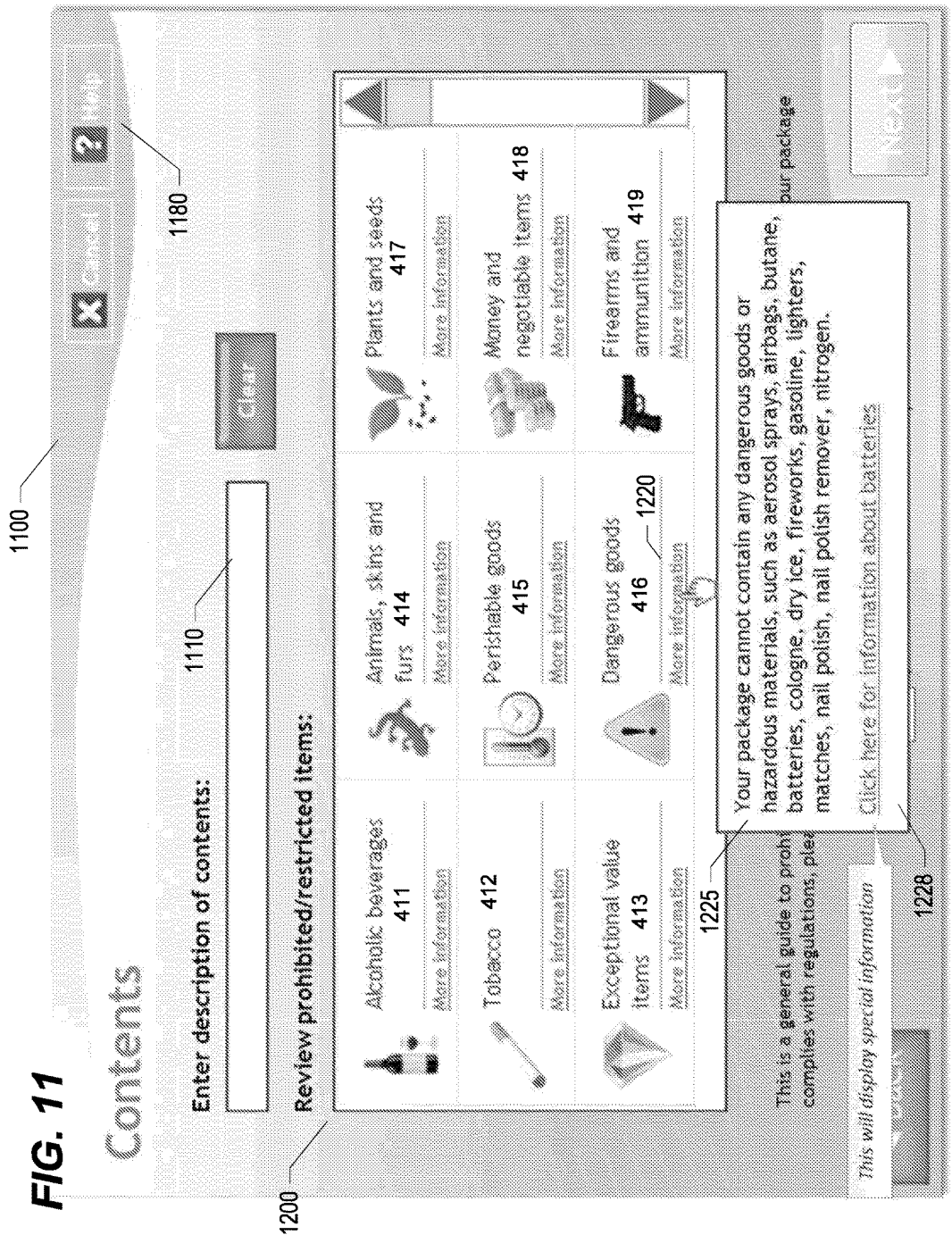
Figure 12:
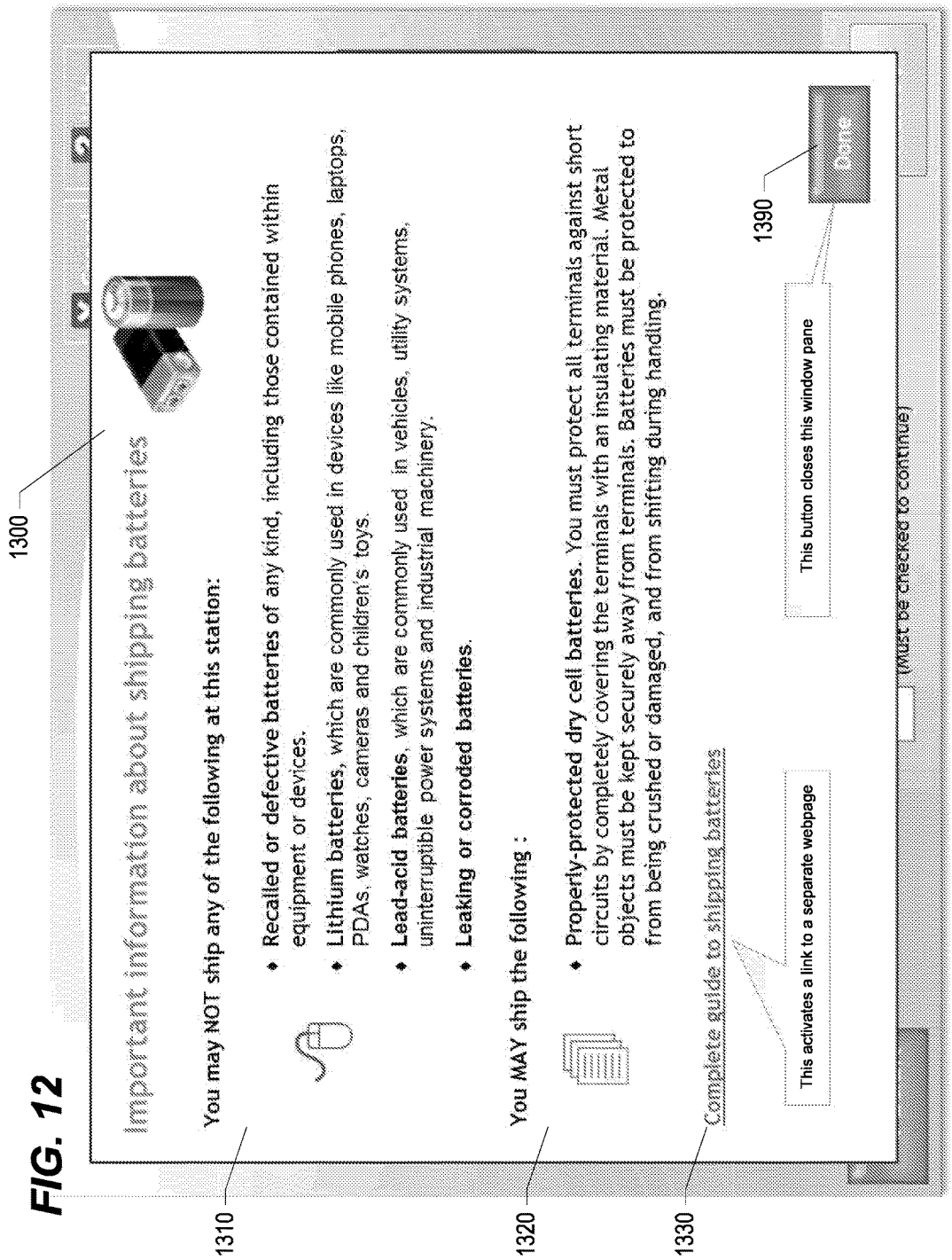
Figure 13:
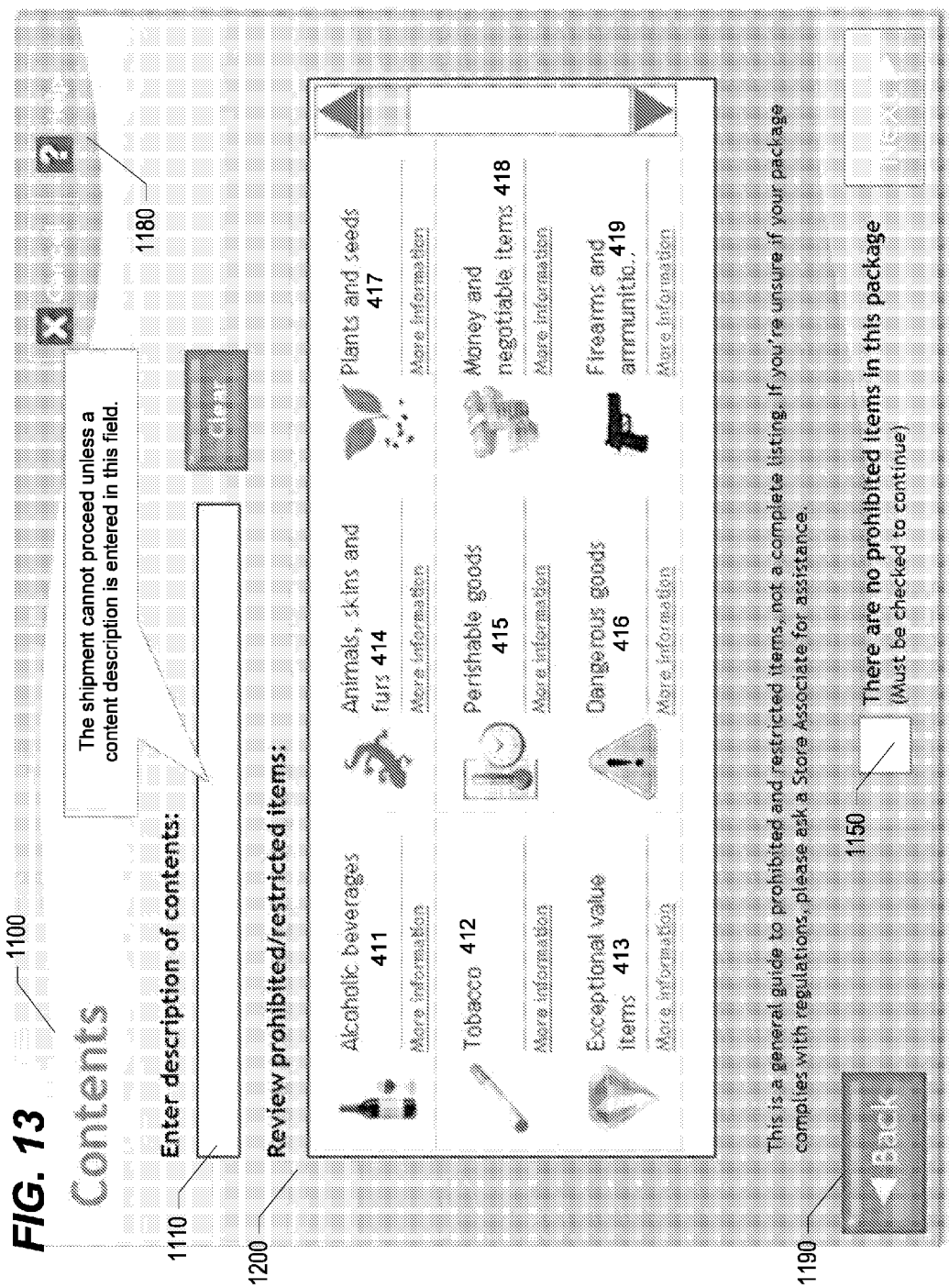
Figure 14:
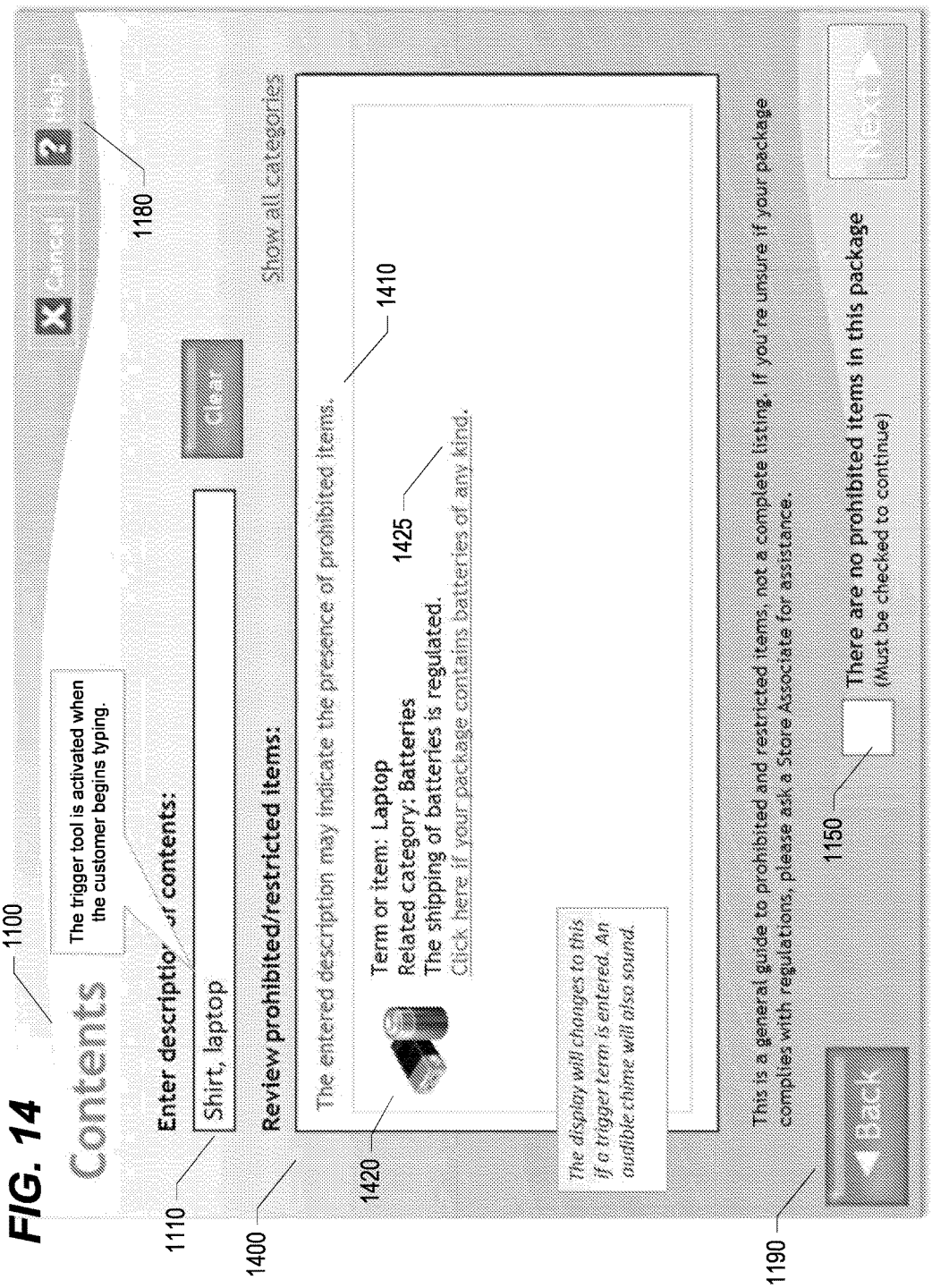
Figure 15:
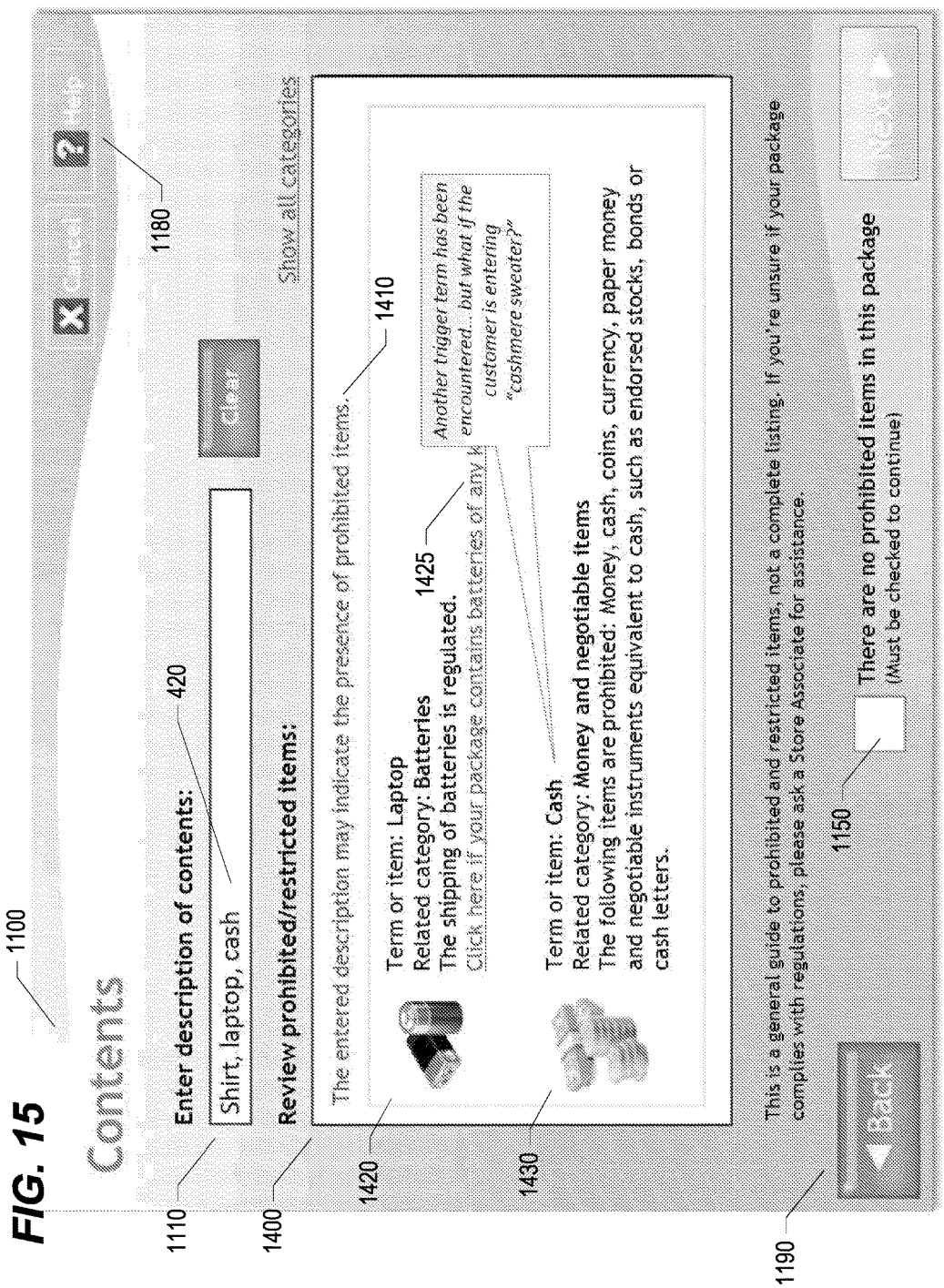
Figure 17:
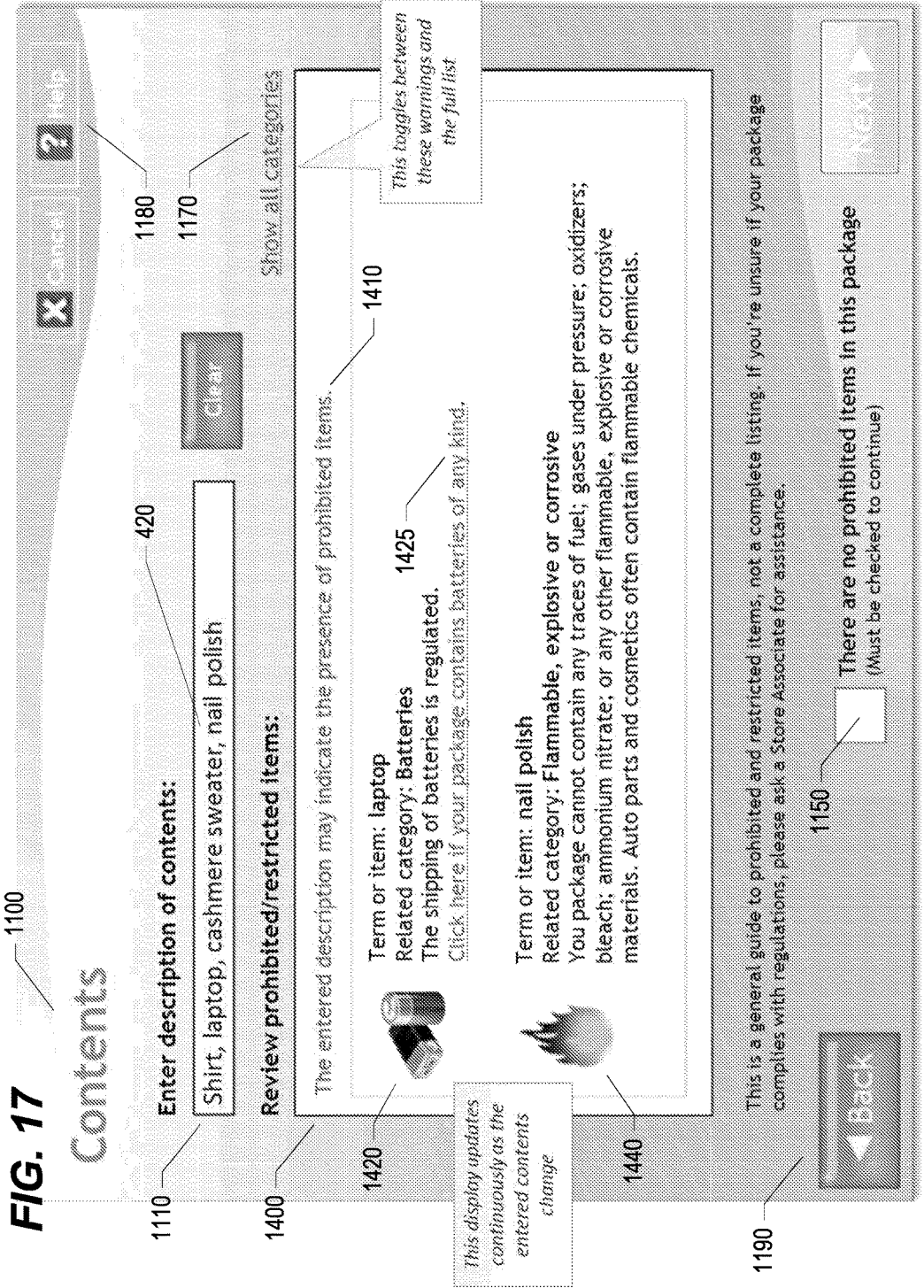
Figure 19:
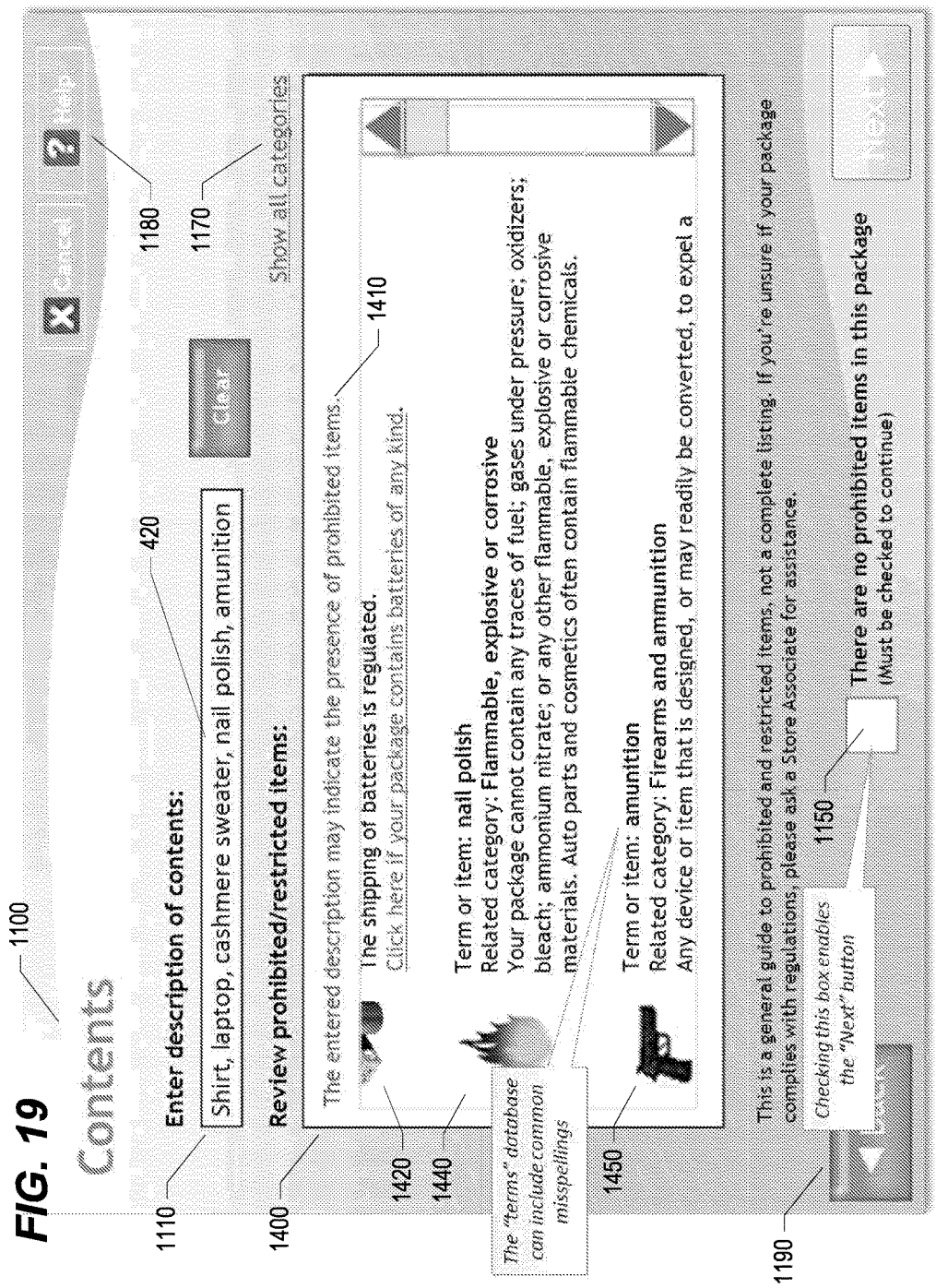
Figure 20:
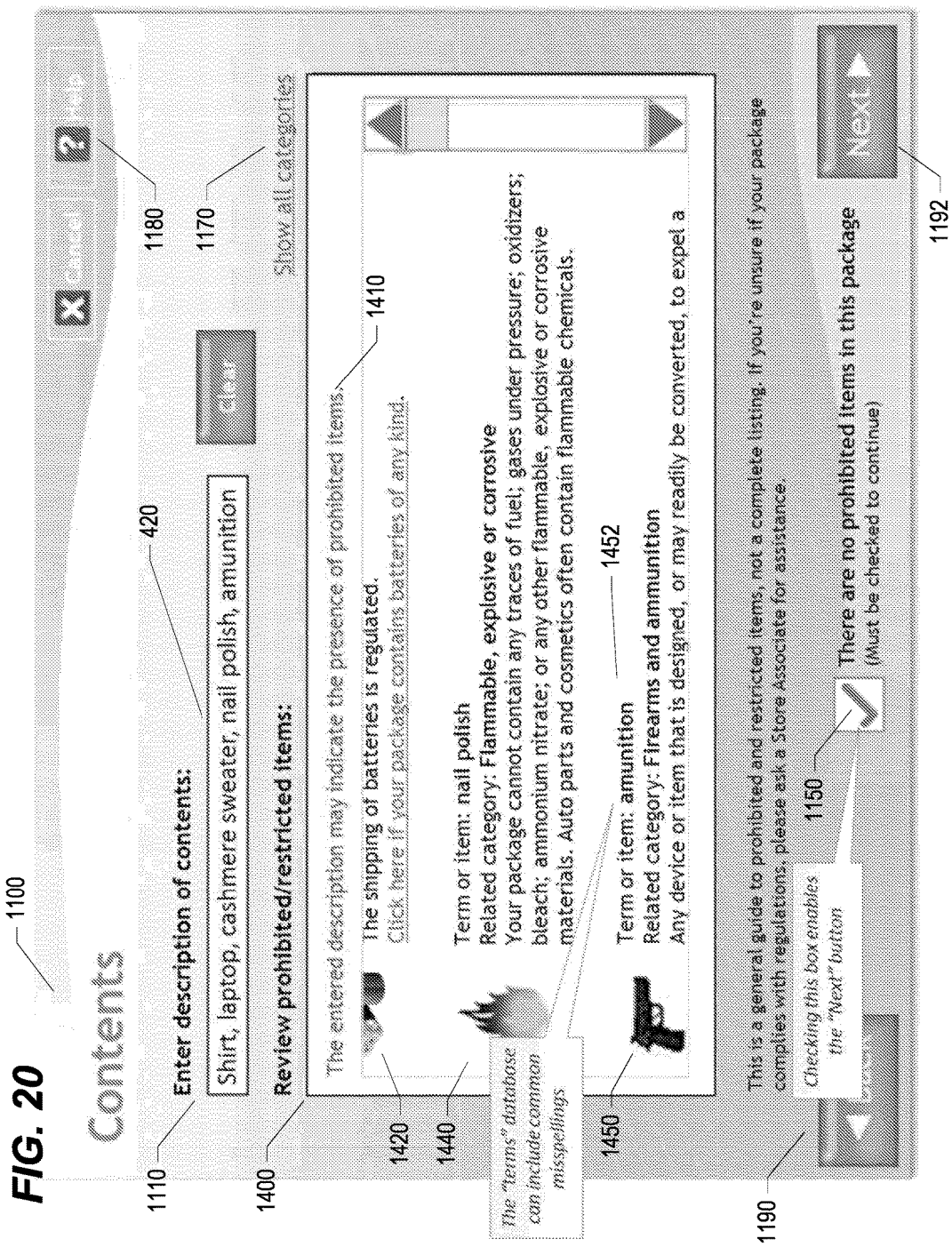
Figure 21:
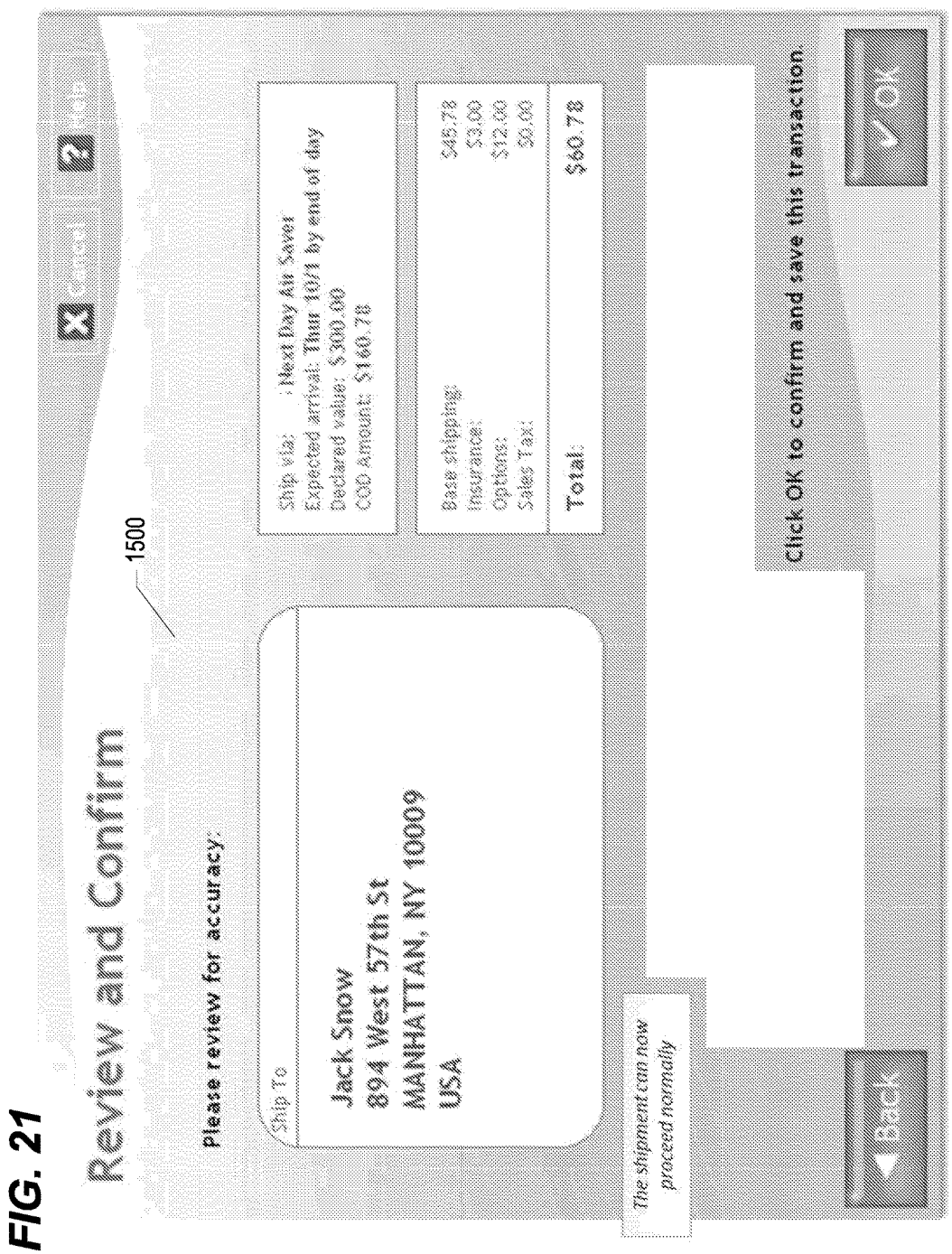
Figure 22:
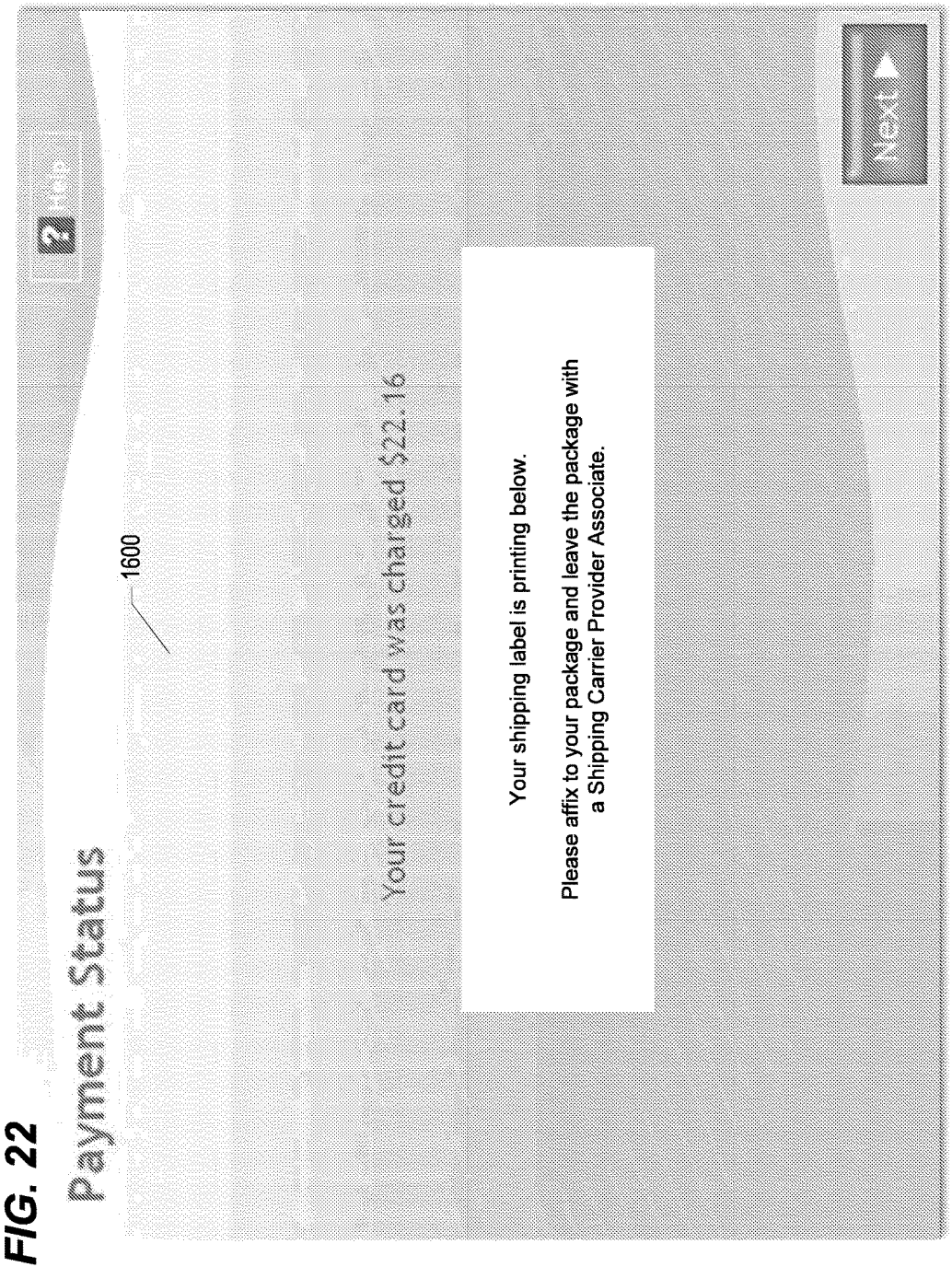

FIG. 5 is a schematic block diagram of a data module 400, a trigger term module 500, and a report module 600, as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the trigger term module 500 shown in FIGS. 2 and 5; a FIG. 8 illustrates an exemplary process flow according to various embodiments for the report module 600 shown in FIGS. 2 and 5;

FIG. 9 is a view of an exemplary service selection screen display 1000 of an exemplary user interface of the shipping request system 20 according to various embodiments;

FIG. 10 is a view of the exemplary content selection screen display 1100 of the user interface of FIG. 9, further illustrating a categorical overview panel 1200 according to various embodiments;

FIG. 11 is a view of the exemplary content selection screen display 1100 of FIG. 10, further illustrating an exemplary information preview panel 1225 accessible via various embodiments of the categorical overview panel 1220 of FIG. 10;

FIG. 12 is a view of the exemplary categorical detail panel 1300 of the user interface of FIG. 9 according to various embodiments;

FIG. 13 is another view of the exemplary content selection screen display 1100 of the user interface of FIG. 9, further illustrating a content entry portion 1110 according to various embodiments;

FIG. 14 is a view of the exemplary content selection screen display 1100 of the user interface of FIG. 9, further illustrating an exemplary trigger term panel 1400, as may, according to various embodiments, be associated with a trigger term module 500 of the system and be displayed upon entry of text within the content entry portion 1110;

FIG. 15 is another view of the exemplary trigger term panel 1400 of FIG. 14, illustrating multiple descriptive portions 1420, 1430, displayed according to various embodiments upon entry of one or more "trigger terms" in the content entry portion 1110;

FIG. 16 is a view of the exemplary content selection screen display 1100 of the user interface of FIG. 9, illustrating a dynamic update feature of the exemplary trigger term panel 1400 of FIG. 14 according to various embodiments;

FIG. 17 is another view of the exemplary content selection screen display 1100 of the user interface of FIG. 9, illustrating further features thereof according to various embodiments;

FIG. 18 is a view of the exemplary content selection screen display 1100 of the user interface of FIG. 9, illustrating a "toggling" feature according to various embodiments for switching between the trigger term panel 1400 and the categorical overview panel 1200 even after entry of data within the content entry portion 1110;

FIG. 19 is a view of the exemplary content selection screen display 1100 of the user interface of FIG. 9, further illustrating a "common misspelling" feature found within the system and displayed via at least the trigger term panel 1400 according to various embodiments;

FIG. 20 is a view of the exemplary content selection screen display 1100 of the user interface of FIG. 9, further illustrating a confirmation portion 1150 according to various embodiments;

FIG. 21 is a view of an exemplary review and finalization screen display 1500 of the user interface of FIG. 9, as may be associated with the report module 600 according to various embodiments; and FIG. 22 is a view of an exemplary reporting screen display 1600 of the user interface of FIG. 9 according to various embodiments.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to facilitate consistent identification of prohibited articles by providing a tool that runs an application to dynamically analyze "description of contents" information, in a real-time fashion as such description is supplied by a customer requesting a shipment. In certain embodiments, the application will dynamically analyze the customer entered data against a likewise dynamic list of known trigger terms, each indicating that a particular hazardous and/or prohibited material may be present. If a match or near-match is found, the tool will block further completion of the shipment request and facilitate the customer answering further questions concerning their shipment. If the issue cannot be resolved electronically, the application will facilitate connecting the customer to a customer center representative.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture

Figure 1:
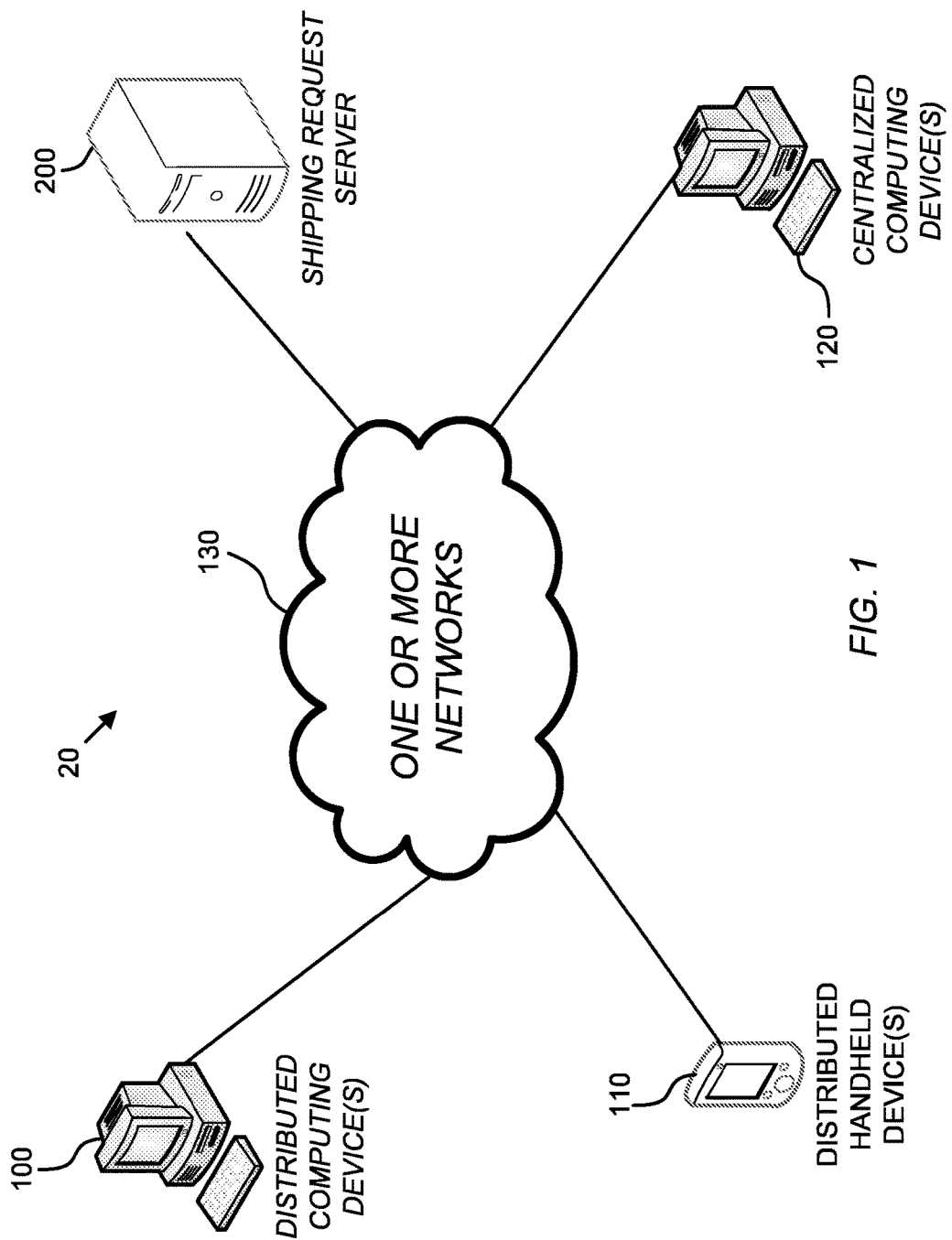
FIG. 1 is a block diagram of a shipping request system 20 according to various embodiments.

FIG. 1 is a block diagram of a shipping request system 20 that can be used in conjunction with various embodiments of the present invention. In at least the illustrated embodiment, the shipping request system 20 may include one or more distributed computing devices 100, one or more distributed handheld devices 110, and one or more central computing devices 120, each configured in communication with a shipping request server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the shipping request server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In certain embodiments, one or more of the distributed computing devices 100 and the distributed handheld devices 110 may be associated with an independent third party user, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Shipping Request Server 200

In various embodiments, the shipping request server 200 includes various systems for performing one or more functions in accordance with various embodiments of the present invention, including those more particularly shown and described herein. It should be understood, however, that the shipping request server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

FIG. 2 is a schematic diagram of the shipping request server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200.

In addition, the shipping request server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the shipping request server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, a trigger term module 500, and a report module 600. In these and other embodiments, the various modules 400, 500, 600 control certain aspects of the operation of the shipping request server 200 with the assistance of the processor 230 and operating system 280. In still other embodiments, it should be understood that one or more additional and/or alternative modules may also be provided, without departing from the scope and nature of the present invention.

In general, as will be described in further detail below, the data module 400 is configured to receive, store, manage, and transmit restricted content data 410, input content data 420, trigger term data 430, and shipment data 440 (see FIG. 5). According to various embodiments, the data module 400 is configured to provide any combination of the above data to at least the trigger module 500, whether proactively or upon request therefor. In certain embodiments, at least a portion of the data, such as for example the shipment data 440 may be separately provided to the report module 600, as will be described in further detail below.

Upon receipt and/or retrieval of any portion of the above-referenced data (although in particular input content data 420 and/or shipment data 440), the trigger module 500 is configured to activate a trigger term tool 510 (see FIG. 5). The trigger term tool 510 is configured to "scrub" (i.e., compare) at least the input content data 420 against the restricted content data 410 so as to identify matches (or near- or partial-matches) to restricted content items, as may be defined according to various embodiments by any of a variety of regulatory entities, as commonly known and understood in the art. If any correlations exist to sufficiently "trigger" a match, the trigger term tool 510 is configured to generate restricted data 512, which comprises at least the matched (or correlated) terms and transmit such to the report module 600. If no "matching" correlations exist, the trigger term tool 510 continues processing dynamically received data until either (1) a match is identified; or (2) no matches are identified, in which case unrestricted data 514 is generated. In either scenario, before completing processing, the trigger term tool 510 according to various embodiments is further configured to confirm completion of data input and generate confirmation data 516, which is likewise transmitted to the report module 600.

According to various embodiments, the report module 600 is configured to activate one or more of a restriction tool 610 and a shipment tool 620 to further processes received restricted data 512, unrestricted data 514, and/or confirmation data 516. In this manner, the report module 600 generates one or more reports, notifications, and/or alerts, as may be desirable for certain applications. All of these features and still further details surrounding the operation and configuration of the various modules 400, 500, and 600 will be described in further detail later herein.

In various embodiments, the program modules 400, 500, 600 are executed by the shipping request server 200 and are configured to generate one or more graphical user interfaces, reports, instructions, and/or notifications/alerts, all accessible and/or transmittable to various users of the system 20. Exemplary user interfaces and the like may be seen in at least FIGS. 9-22, all of which will be described in further detail below. In certain embodiments, the user interfaces, reports, instructions, and/or notifications/alerts may be accessible via one or more networks 130, which may include the Internet or other feasible communications network, as previously discussed. In other embodiments, one or more of the modules 400, 500, 600 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600 may send data to, receive data from, and utilize data contained in, one or more databases, which may be comprised of one or more separate, linked and/or networked databases.

Also located within the shipping request server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the shipping request server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, exemplary illustration of which may be seen in at least FIGS. 9-22, as will be described in further detail below. The user input interface, in turn, can comprise any of a number of devices allowing the entity to receive data from a user, such as a keypad, a touch display, a joystick or other input device.

While reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

Shipping Request Server 200 Logic Flow

Reference is now made to FIGS. 3-8, which illustrate various logical process flows executed by various embodiments of the modules described above. In particular, FIG. 3 illustrates the overall relationship of the modules 400, 500, 600 of the shipping request server 200, according to various embodiments. As illustrated, operation of the system 20 begins, according to various embodiments, with the execution of the data module 400, which receive, store, manage, and transmit restricted content data 410, input content data 420, trigger term data 430, and shipment data 440 (see FIG. 5). At least portions of the data are provided, as desirable, to at least the trigger term module 500. The trigger module 500 is generally configured according to various embodiments to execute one or more tools to "scrub" (i.e., compare) at least the input content data 420 against the restricted content data 410 so as to identify matches (or near- or partial-matches) to restricted content items. If any restricted items are identified, restricted data 512 is generated for further processing, which according to certain embodiments halts further efforts to ship the item until pertinent restrictions are addressed. The report module 600 is configured according to various embodiments to generate one or more reports, notifications, alerts, and the like, all as may be desirable for particular applications, depending upon the generation of restricted data 512.

Detailed steps performed by various embodiments of the data module 400 are described in relation to FIG. 6; steps performed by various embodiments of the trigger term module 500 are described in relation to FIG. 7; and steps performed by various embodiments of the report module 600 are described in relation to FIG. 8. Exemplary graphical user interfaces associated with each module and the steps performed thereby are illustrated in at least FIGS. 9-22, which will be referenced in relation to the steps and processes of FIGS. 6-8, as necessary.

Figure 4:
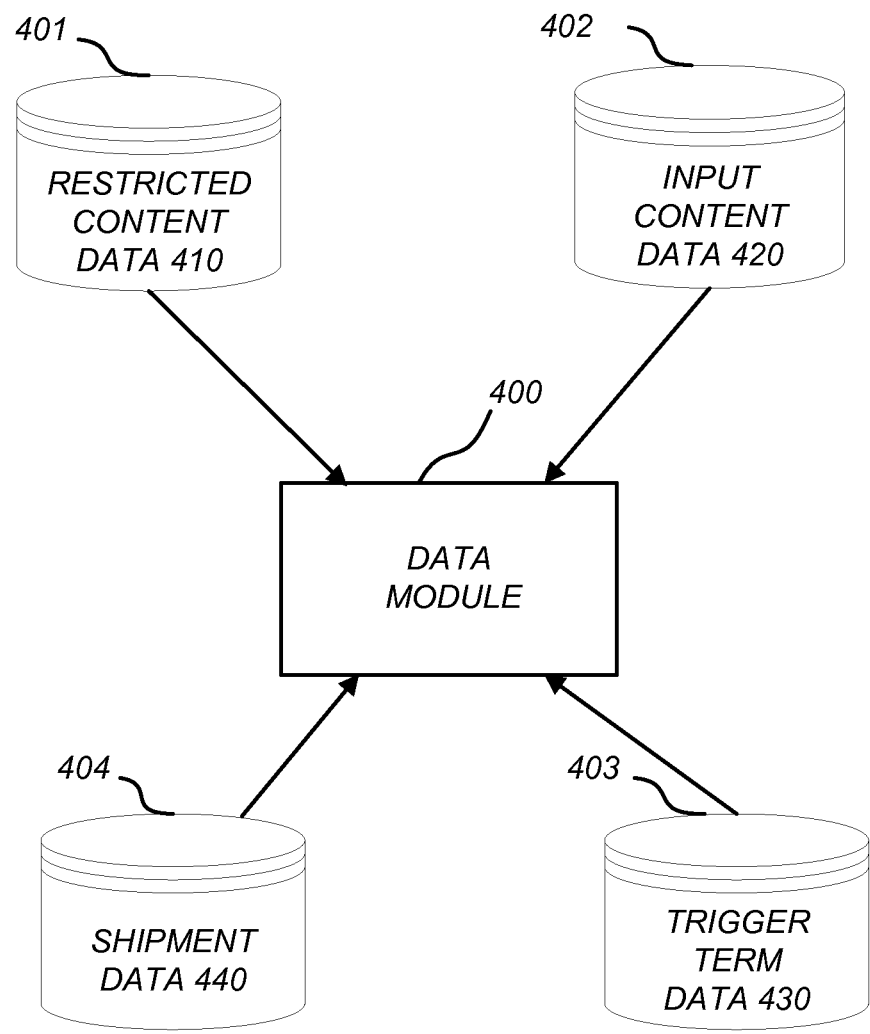
FIG. 4 illustrates a schematic diagram of various databases that are utilized by the shipping request system 20 shown in FIG. 1 according to various embodiments.

As will be described in more detail below in relation to FIGS. 4 and 5, the data module 400, according to various embodiments, is configured to receive, store, manage, and transmit restricted content data 410, input content data 420, trigger term data 430, and shipment data 440 between one or more databases in communication with the module 400 and at least the trigger term module 500. FIG. 4 illustrates a block diagram of various exemplary databases via which the data module 400 manages this information. In particular, in at least the embodiment shown in FIG. 4, the following databases are provided: a restricted content data database 401, an input content data database 402, a trigger term data database 403, and a shipment data database 404. Although the embodiment of FIG. 4 shows these databases 401, 402, 403, 404 as being separate databases each associated with different types of data, in various other embodiments, some or all of the data may be stored in the same database. In still other embodiments, additional and/or alternative databases may be provided, as may also be desirable for particular applications.

According to various embodiments, the restricted content data database 401 may be configured to store and maintain a variety of restricted content data 410. In certain embodiments, the restricted content data 410 may comprise any of a variety of information concerning parameters associated with the restriction and/or prohibition of shipping any of a plurality of restricted items via a common carrier service provider. Non-limiting examples include alcoholic item data 411, tobacco item data 412, exceptional value item data 413, animal skin & fur item data 414, perishable good data 415, dangerous good data 416, plant & seed data 417, money & negotiable item data 418, and firearms & ammunition data 419, all as illustrated further in FIG. 11. It should be understood that according to various embodiments, a variety of details regarding these and still other types of data subjected to restrictive and/or prohibitive parameters may be stored within the database 401. Non-limiting examples of such details may include in-depth descriptions of sub-categories of restricted and/or prohibited items falling within broader categorical groups, as will be described in further detail below. Other non-limiting examples include sources of the restrictions and/or prohibitions, along with guidance to facilitate alternative shipping arrangements and/or to clarify any confusion.

As mentioned, each exemplary category of data (411-419) may include at least one or more subcategories of data for each. As a non-limiting example, which may be understood from further reference to FIG. 11, the dangerous goods data 416 may further contain descriptive data identifying that such includes at least aerosol sprays, airbags, butane, batteries, cologne, dry ice, fireworks, gasoline, lighters, matches, nail polish, nail polish remover, and nitrogen. In certain embodiments, an additional granularity of guidance data may also be provided (see 1128 of FIG. 11), which data may also be stored and maintained in the database 401.

It should further be understood that the restricted content data 410 within the database 401 may be received from a variety of sources, either external or internal to the provider of the system 20, as may be appropriate given particular applications. For example, in certain embodiments, at least a portion of the data 410 may be based at least in part upon restrictions and/or parameters self-imposed by the common carrier provider. In other embodiments, at least a portion of the data 410 is based at least in part upon industry and/or otherwise legislatively imposed restrictions and/or parameters, as promulgated by the non-limited example of the Federal Aviation Association (FAA). It any of these and still other embodiments, the data 410 within database 401 may be periodically and dynamically updated, as updates are made to regulations, parameters, and the like, providing the system 20 with an efficient tool for consistently and accurately identifying and preventing unauthorized shipment of restricted and/or prohibited items.

In any event, in these and still other embodiments, it should be understood that, upon receipt, the restricted data database 401 will store any newly received restricted content data 410 in a manner associated with at least the data module 400 and for provision (whether automatically, manually, or at a later time) to one or more of the modules 500-600, as will also be described in further detail below. In certain embodiments, updated restricted content data 410 will overwrite previously existing data 410, for example, where regulatory parameters have been changed; in other embodiments, however, updated data may be stored in a manner complementary of pre-existing restricted content data 410, as may be desirable for particular scenarios. Of course, in any of these and still other embodiments, a variety of alternative configurations could exist, as commonly known and understood in the art.

According to various embodiments, the input content database 402 may be configured to store and maintain input content data 420 associated with data input by a customer seeking to ship an item via a common carrier service provider and generally describing the item itself. Such may be received, for example, via user interfaces such as those exemplary interfaces illustrated in at least FIGS. 10-19, as will be described in further detail later herein. Non-limiting examples of input content data 420 include textual entries of terms such as "laptop," "shirt," "cash," "stuffed animal," "cashmere sweater," "battery," "trumpet," "nail polish," "diploma," "books," "divorce documents," "painting," "pictures," "fake nails," "50 caliber rounds," and the like. It should be understood generally that the input content data 420 may include virtually any textual description entered by a user of the system 20 via, for example, the content entry portion 1110 of the exemplary content selection screen display 1100 of at least FIG. 11, as will be described in further detail below. Still further, in any of these and still other embodiments, it should be understood that, upon receipt, the input content database 402 will store any such input content data 420 in a manner associated with at least the data module 400 and for provision (whether automatically, manually, or at a later time) to at least the trigger term module 500, as will also be described in further detail below. Of course, in any of these and still other embodiments, a variety of alternative configurations could exist, as commonly known and understood in the art.

According to various embodiments, the trigger term database 403 may be configured to store and maintain a variety of trigger term data 430, which may generally include a plurality of terms, partial terms, and misspellings thereof that equate to and/or are at least in some fashion associated to items that are subject to restriction and/or prohibition, as defined by at least the restricted content data 410 of the restricted content data database 401, as has been previously described herein. In this manner, it should be understood that, given the dynamic fluctuation of data within the database 401, a corresponding dynamic fluctuation of trigger term data 430 must necessarily ensue according to various embodiments. Non-limiting examples of trigger term data 430 includes "cash," "currency," "computer," "stocks," "ammunition," "nail polish," "nail," "fur," "seed," "cigarettes," and the like. Still further non-limiting examples of data 430 that may be more indirectly associated with the restricted content data 410 includes "weed," "cigs," "beer," "white lighting," "pumpkin," "antler," "cologne," "aerosol," "diamond," "Rolex," "meat," and the like. Common misspellings may also be incorporated, such as "ammunition," "colone," "arosol," and the like, as will be described in further detail below.

As mentioned, according to various embodiments, the trigger term data 430 may be periodically and/or dynamically subject to update, separate from or in parallel to generally corresponding updates and revisions to the restricted content data 410. It should be appreciated that updates of this nature may likewise originate from sources internal or external to the common carrier shipping provider, who typically provides to an end user (e.g., customer) the system 20. In any of these embodiments, upon receipt, the database 403 will store any such received/updated trigger term data 430 in a manner associated with at least the data module 400 and for provision (whether automatically, manually, or at a later time) to at least the trigger term modules 500, as will also be described in further detail below. Of course, in still other embodiments, a variety of alternative configurations could exist, as commonly known and understood in the art.

According to various embodiments, the shipment data database 404 may be configured to receive, store, and maintain shipment data 440 that may comprise any of a variety of information associated with one or more parameters necessary to facilitate and process a shipping request. Non-limiting examples include customer data (e.g., name, address, account number, financial/billing/payment information, etc.), recipient data (e.g., name, address, etc.), package data (e.g., weight, size, type, etc.), and service data (e.g., type, rates, availability, selections, etc.). It should be understood that, according to various embodiments, the shipment data database 404 may be configured to receive, store, and maintain data from a variety of sources. For example, certain rate and availability data may be received from the common carrier service provider, while selections thereof for a particular shipping request may be received from a user of the system 20.

As a non-limiting example, best understood with reference to at least FIG. 9, which illustrates an exemplary service selection screen display 1000 of an exemplary user interface of the shipping request system 20, various portions of the shipment data 440 may be displayed via the user interface. As illustrated, the screen display 1000 may comprise a view portion 1010, wherein a user may "sort" available services according to one or more preference (e.g., the illustrated lowest cost versus fastest delivery parameters). The screen display 1000 may also comprise a selection portion 1020, wherein a user may not only view various services (e.g., "All," "Ground Only," "Air Only," etc.), but also select a desirable service for their particular shipping request needs. As will be described in further detail below, in certain embodiments, the particular shipping service selected may, at least in part, influence the activated trigger term data 430, as restrictions and/or prohibitions upon shipping a specific item may vary depending upon the shipping medium. For example, ammunition that might be prohibited for air transit may simply be restricted to ten rounds per package on ground transit. Other scenarios may be envisioned wherein restrictions may vary dynamically, as should be understood without departing from the scope and nature of the present invention.

Still further, in any of these and still other embodiments, upon receipt, the shipment data database 404 will store any such received shipment data 440 in a manner associated with at least the data module 400 and for provision to one or more of the modules 500-600, as will also be described in further detail below. Of course, in any of these and still other embodiments, a variety of alternative configurations could exist, as commonly known and understood in the art.

According to various embodiments, any of the previously described databases may be configured to store and maintain not only textually based data, but also graphically based data, as may be generated by the transportation network dynamic management system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, and the like, all as will be described in further detail elsewhere. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored within the system 20, as may be desirable for various applications.

Summary of Exemplary System Operation

As indicated above, various embodiments of the shipping request server 200 execute various modules (e.g., modules 400, 500, 600) to provide a tool that dynamically identifies restricted items within customer requests for shipping one or more packages via a common carrier service provider, while also maintaining a high level of customer convenience.

According to the embodiment shown in FIG. 5, the shipping request server 200 begins with the execution of the data module 400, which is configured to receive, store, manage, and transmit restricted content data 410, input content data 420, trigger term data 430, and shipment data 440, the details of which have been described previously herein. In certain embodiments, at least a portion of the data 410-440 is provided to the trigger term module 500 for further processing, either automatically upon, for example, receipt of input content data 420 or otherwise, as may be desirable for particular applications. In at least the illustrated embodiment of FIG. 5, at least a portion of the shipment data 440 may be likewise provided to the report module 600, which may, for example, use such for finalizing an approved shipping request, either upon identification of no restricted data/items or upon resolution of any identified, as will be described in further detail below. Of course, it should be understood that various alternatives may exist within the configured processes of the data module 400, all as will be described in further detail below.

In various embodiments, the trigger term module 500 is configured to receive various pieces of data 410-440 (at least initially, in certain embodiments, a portion of input content data 420 and/or a portion of shipment data 440, as will be described in further detail elsewhere herein) from the data module 400 and upon receipt thereof activate a trigger term tool 510. In certain embodiments the trigger term tool 510 is configured to "scrub" (i.e., compare) at least the received input content data 420 against trigger term data 430 associated therewith, so as to dynamically identify matches, near-matches, and/or associations there-between that are indicative of a restricted and/or prohibited item. Upon detection thereof, the tool 510 generates restricted data 512, which may comprise at least the input content data 420 and a portion of associated restricted content data 410. If no "trigger terms" are implicated in the data, the trigger term tool 510 is configured according to certain embodiments to generate unrestricted data 514 indicative thereof. At some point, a user of the system 20 will complete their entry of input content data 420, at which point the trigger term tool 510 is configured according to various embodiments to require a confirmation thereof prior to further processing a shipping request. In such embodiments, the trigger term tool 510 may be configured to further generate confirmation data 516 indicative thereof.

In various embodiments, the report module 600 is configured to, upon receipt of restricted data 512 activate a restriction tool 610, which is configured to generate one or more notifications associated with the receipt thereof. For example, the restriction tool 610 may be configured to generate, transmit, and/or display one or more restriction transmittals 612. In certain embodiments the transmittals may be alerts (whether audible, visual, textual, or otherwise), as generated when restricted data 512 indicative of the identification of a restricted or prohibited item is received. In certain embodiments, such may occur dynamically and/or automatically upon generation of the restricted data 512, without delay for receipt of confirmation data 516, as will be described in further detail below.

As may be seen from FIG. 5, the report module 600 is further configured according to various embodiments to, upon receipt of any of restricted data 512, unrestricted data 514, and/or confirmation data 516 to activate a shipment tool 620. Where restricted data 512 has been received, the shipment tool 620 may generate one or more shipment transmittals 622, which may be indicative of a refusal to approve the shipment request on the basis of the presence of one or more prohibited or restricted items. In other embodiments, the transmittals 622 may be indicative of a solution reached via the system 20 to facilitate approval of the shipping request regardless of the identification of restricted data, for example, by negotiating with the customer to either limit or remove the restricted or prohibited item from the request. Where only unrestricted and/or confirmation data is received by the report module 600, the shipping tool 620 may be generally configured to generate one or more shipment transmittals 622 approving the shipping request. In at least one embodiment, the shipment transmittal 622 may comprise a shipping label, generated at least in part based upon the shipment data 440 further received and/or retrieved from the data module 400. Of course, various alternatives may exist, all as will be described in further detail below.

Data Module 400

According to various embodiments, as previously mentioned herein, the data module 400 is configured to receive, store, manage, and transmit restricted content data 410, input content data 420, trigger term data 430, and shipment data 440. Receipt may be from any of a variety of entities (e.g., a common carrier shipment provider, users of the system 20, etc.) and transmission may be to one or more of the trigger term and report modules 500-600, as will be described in further detail below.

FIG. 6 illustrates steps that may be executed by the data module 400 according to various embodiments. Beginning with step 450, the data module 400 assesses whether any data (e.g., data 410, 420, 430, and/or 440, as illustrated in FIG. 5) has been received by the module. In certain embodiments, the data module 400 makes this assessment by periodically scanning one or more databases (see FIG. 4) associated with the module and by identifying some portion of data within one or more of the databases that was not present during a previous periodic scan under step 450. Of course, alternative configurations may be envisioned, wherein, as a non-limiting example, the data module 400 may actively receive data (e.g., as input by a user of the system 20 via an interface) and upon receipt thereof, execute step 440. In any of these and still other various embodiments, if "newly received" data is identified, the data module 400 proceeds to step 470; otherwise the module proceeds into a static loop via step 455.

During step 455, the data module 400 may be configured to passively stand by for receipt of new data, whether in the form of restricted content data 410, input content data 420, trigger term data 430, shipment data 440, and the like. In certain embodiments, the module 400 may, in step 455, periodically (e.g., every 5 seconds, or at any desirable interval) proactively ping one or more databases contained therein. Various alternative data monitoring configurations may be envisioned, without departing the scope and nature of the present invention.

It should generally be understood that, according to various embodiments, the primary types of data received during the course of operation will be either shipment data 440 or input content data 420. As a non-limiting example, a user of the system 20 may access the same through an interface such as that illustrated in FIG. 9. Via such an exemplary service selection screen display 1000, the user could not only choose a display order (i.e., sorting) of shipment service option in portion 1010, but also select a desirable shipment "service that best meets [their] needs" in portion 1020. The user selection of a shipment service option in portion 1020 constitutes at least a portion of shipment data 440 according to various embodiments. As will be described in further detail later, upon entry of a service selection, the user may navigate (e.g., via navigation portion 1090) to the exemplary content selection screen display 1100 (see, for example, FIG. 10), all as will be described in further detail below. With reference momentarily, however, for FIG. 10, it should be understood that the input content data 420 may be received via the exemplary content selection screen display 1100, specifically according to various embodiments via the content entry portion 1110, as will also be described in further detail below.

Returning to FIG. 6, upon receipt of either input content data 420 and/or shipment data 440, the data module 400 proceeds to step 470, during which the data module transmits the received data to at least the trigger term module 500 for further handling and processing. In certain embodiments, the shipment data 440 may be simultaneously or later transmitted additionally and/or alternatively to the report module 600. It should be understood, however, that in at least the illustrated embodiment, at least the service selection portion of the shipment data 440 is transmitted likewise to the trigger term module 500, as such at least in part determines the applicable trigger term data 430 and restricted content data 410 that is retrieved by the trigger term module 500, as will also be described in further detail below.

According to various embodiments, during step 470, as previously described herein, the data module 400 is configured to transmit at least a portion of received data to at least the trigger term module 500. In certain embodiments, the data module 400 may be configured to automatically perform step 470, while in other embodiments, the module may perform such only periodically, at an interval predetermined by one or more users of the system 20, as may be desirable for particular applications. In still other embodiments, the data module 400 may automatically transmit a portion of the data (e.g., input content data 420 and/or shipment data 440), while another portion of the data (e.g., restricted content data 410 and/or trigger term data 430) may be transmitted subsequently, for example, upon request therefor by the trigger term module 500, as will be described in further detail below.

Trigger Term Module 500

As previously described, upon receipt and/or retrieval of any portion of input content data 420 and/or shipment data 440, the trigger term module 500 is configured to activate a trigger term tool 510

With reference now to FIG. 7, which illustrates various steps that may be executed by the trigger module 500, according to various embodiments the module is configured to begin in step 520 by receiving at least some portion of data from the data module 400. It should be understood that in certain embodiments, the trigger term module 500 may be configured to periodically and/or continuously proactively retrieve and/or check for new data 410-440, as may be transmitted from the data module 400. In other embodiments, the trigger term module 500 may merely passively await receipt of data from the data module, as may be desirable for particular applications.

According to various embodiments, data received in step 520 may comprise either input content data 420 or shipment data 440, both of which may be entered by a user via exemplary interface screen displays 1000, 1100. With reference momentarily to FIG. 9, it should be understood that via an exemplary display such as service selection screen display 1000, the user may input shipment data 440 at least by selecting a desirable shipment "service that best meets [their] needs," as illustrated in portion 1020. With reference momentarily to FIG. 10, it should also be understood that via an exemplary display such as content selection screen display 1100, the user may input content data 420 at least by typing one or more terms descriptive of the items for which they are entering a shipping request. Such user interface screens and such will be further described elsewhere herein, but provide useful context and will also be periodically referenced throughout the remainder of the description surrounding the steps executed by the trigger module 500.

Returning now to FIG. 7, upon completion of step 520, the trigger term module 500 is configured according to various embodiments to proceed to step 525, during which the module assesses whether the data received comprises input content data 420 or shipment data 440, the entry of which as has been previously described herein. If the data comprises shipment data 440, the trigger term module 500 is configured according to various embodiments to proceed to step 530; otherwise, the module proceeds alternatively to step 550.

During step 530, the trigger term module 500 is configured according to various embodiments to retrieve at least a portion of the restricted content data 410 located in one or more databases within the data module 400. In certain embodiments, the scope of retrieval is based at least in part upon the nature of the shipment data 440. For example, where the shipment data 440 comprises a ground transportation selection, certain portions of the restricted content data 410 applicable only to air transportation would not be retrieved in step 530. In this manner, the retrieval and display of restricted content data 410 (see also FIG. 10) is specifically tailored based at least in part upon the service selection entered by a user as a portion of the shipment data 440.

As should be evident from FIG. 7, in certain embodiments, the trigger term module 500 is configured in step 530 to further display a categorical overview panel 1200 in connection with retrieval of the described relevant portion of restricted content data 410. FIG. 10 proves informative in this regard, wherein the categorical overview panel 1200 may be seen, as may be embedded according to various embodiments within the content selection screen display 1100. In this manner, in certain embodiments, upon entry of shipment service selection data 440, the panel 1200 provides users with a "browsing" capability, so as to review various applicable and/or relevant restrictive or prohibited item categories, presumably prior to entry of specific content data, as will be described in further detail elsewhere herein. As FIG. 10 illustrates, the panel 1200 may comprise a plurality of item summary blocks 1210, within which additional or "more information" may be requested (see 1220).

With combined reference to FIGS. 7 and 10, upon display of the categorical overview panel 1200 in step 530, the trigger term module 500 may be configured according to further embodiments to proceed to step 535, where it is queried whether a user of the panel is requesting categorical details (i.e., "more information," as illustrated as 1220). If categorical details are requested, the trigger term module 500 may, in certain embodiments proceed to step 545, wherein a categorical detail panel 1300 (see FIG. 12) may be displayed. As will be described elsewhere herein, the detail panel 1300 may provide extensive details of what may and may not be shipped according to location, service type, or other parameters. Of course, in other embodiments, the trigger term module 500 may be configured such that in step 545 a "pop-up" window 1225 (see FIGS. 10 & 11) first appears with detailed information, from which a user may request still further detail (See FIG. 11, item 1228), after which the detail panel 1300 would appear. Still other alternative display configurations may, indeed, be envisioned, without departing from the scope and nature of the present invention.

Returning specifically, however, to FIG. 7, it should be understood that during step 545, the trigger term module 500 is configured according to various embodiments to provide some degree of further detail for a user that explains the "how/why/when" of a particular regulation behind a categorical restriction and/or prohibition. As a non-limiting example, if "more information" is requested regarding dangerous goods 416 (see FIG. 11), a pop-up window 1225 may explain that "[y]our package cannot contain any dangerous goods or hazardous materials, such as aerosol sprays, airbags, butane, batteries, cologne, dry ice, fireworks, gasoline, lighters, matches, nail polish, nail polish remover, nitrogen." Additional details on batteries may be requested at 1228, prompting the display of panel 1300 of FIG. 12. In this manner, it should be understood that the various detail panels and windows are configured according to various embodiments to provide a degree of guidance to users not otherwise available via only the categorical overview panel 1200 or otherwise. As such, the detail panel 1300 provides a significant improvement over prior systems, especially with regard to its contribution to the accuracy and consistency of identifying prohibited and/or restricted items for which shipment is requested.

If no categorical detail is requested in step 535 of FIG. 7, the trigger term module 500 is configured to proceed to step

540, wherein the module queries whether entry of data (e.g., shipment data 440 and more particularly content data 420) is complete. If so, the module 500 proceeds to step 590 to confirm completion of data input, as will be described in further detail later. If data entry is not complete, the trigger term module 500 is configured according to various embodiments to proceed to step 542, wherein it awaits (either passively or otherwise) receipt of additional data, which will be identified via an iterative loop with step 520, as previously described herein.

Returning now to step 525, wherein the trigger term module 500 determines whether input content data 420 or shipment data 440 was received via step 520, having already described herein if data 440 is involved, if alternatively input content data 420 is involved, the module 500 is configured to proceed instead to step 550. During step 550, as illustrated in FIG. 7, the trigger term module 500 is configured to execute a trigger term tool 510 (see also FIG. 5). As an initial matter, execution of the trigger term tool 510 involves further retrieval (see step 552) by the module of trigger term data 430, as contained within the data module 400. With the input content data 420 and the trigger term data 430 retrieved during step 552, the trigger term module 500 proceeds to step 555, wherein the tool 510 is configured according to various embodiments to determine whether one or more "trigger terms" are identified within the input content data. Such may be determined by executing any of a variety of algorithms, such as the non-limiting example of a character check-sum that compares entered data to stored data on a keystroke by keystroke basis. Of course, any of a variety of commonly known and understood data comparison and/or "scrubbing" algorithms may be employed, as such are commonly known and understood to exist in the art.

Notwithstanding, the tool 510 is configured in step 555, generally speaking, to "scrub" the entered input content data 420 against one or more "terms" within the trigger term data 430 for purposes of identifying matches, near-matches, and/or associations there-between. In certain embodiments, the tool 510 may perform a dynamic scrub, whereby a comparison is run between the data 420 & 430 in a real-time fashion, as a user of the system 20 enters data on a keystroke by keystroke basis. Such may be understood with reference to FIGS. 15 & 16, wherein typing of "cash" results in a match to a restricted category of money and negotiable items 418 (see also FIG. 11), but further typing transforming "cash" into "cashmere sweater" eliminates the match and thus any associated display of restricted data 512, as described momentarily below. The exemplary display screens and the exemplary operation thereof will be described in further detail elsewhere herein.

As mentioned, with reference again to FIG. 7, if the trigger term tool 510, during the process of "scrubbing" or comparing the input content data 420 in a dynamic fashion against associated trigger term data 430, implicates one or more "trigger terms" (whether via a direct match, a near-match, a common misspelling therefor, an indirect categorical association therewith, or the like), the trigger term module 500 may be configured according to various embodiments to generate restricted data 512. In certain embodiments, the restricted data 512 may comprise at least some annotation associated with or adhered to at least the implicated portion of the input content data 420, along with at least an indication of the implicated "trigger term." In certain embodiments, the annotation may itself be a marker associated with the data that may inherently identify the implicated "trigger term." Of course, a variety of possible configurations for annotating restricted data 512 may be envisioned, without departing from the scope and nature of the present invention.

In any event, once restricted data 512 is generated in step 565, at least two things occur according to certain embodiments, although in at least one embodiment, they may occur sequentially. First, the trigger term module 500 may be configured according to various embodiments to, via step 570, transmit at least the restricted data 512, or in certain embodiments an indication or notification thereof to the report module 600, which, from such, may be configured to generate one or more reports for relatively immediate transmittal to one or more users of the system. In certain embodiments, such users of the system may include not only the user submitting the request, but also other personnel, for example, those monitoring and/or populating an associated help desk center, as will be described in further detail elsewhere herein. An exemplary alert or report, as may be generated by the report module 600 via execution of step 570 (and other steps, to be described later herein) may be seen as item 1410 of FIG. 15. It should be understood, however, that in any of these and still other embodiments, the transmission of data in step 570 is configured such that at least an alert message is provided to a user of the system 20 substantially simultaneously with execution of step 565 and 575, at least during the latter of which a trigger term panel 1400 is displayed, as will be described in further detail below.

Next, returning momentarily to FIG. 7, the trigger term module 500 may be configured according to various embodiments to, in step 575, retrieve at least a portion of restricted content data 410 (e.g., that restricted content data associated with at least the implicated trigger term) and to display at least such, alongside portions of the trigger term data 430 and/or portions of the input content data 420 via a trigger term panel 1400 such as the exemplary one of FIG. 15. Indeed, with particular reference to FIG. 15, input content data 420 is illustrated in entry portion 1110, whereas restricted data 512 is illustrated in at least certain portions of the trigger term panel 1400, for example identifying the implicated term or terms (e.g., laptop and cash), related categories therefor (e.g., batteries, money, and negotiable items), and/or a brief description thereof (see fields 1420, 1430). Such fields and exemplary display features will be described in further detail elsewhere herein.

With continued reference to FIG. 15, but returning also to FIG. 7, it should be understood that upon completion of step 575, the trigger term module 500 may be configured to proceed to step 580, wherein the module determines whether a user of the system is continuing to input more content data 420 (e.g., via field 1110 of display 1100). If so, the module 500 reverts to steps 550 and 555, wherein the trigger term tool 510 is configured to continue, according to various embodiments, to dynamically "scrub" the data, as such is entered. In at least one embodiment, as has been referenced elsewhere herein, data may be "scrubbed" on a character-by-character basis, in a real-time fashion as user keystrokes occur. Of course, less robust configurations may be envisioned, without departing from the scope and nature of the present invention, provided such maintain a dynamic comparison of entered input content data 420 relative to trigger term data 430 contained within the data module 400.

If, in step 580, the trigger term module 500 determines that entry of input content data 420 has at least momentarily halted, the module proceeds to step 585, wherein it is queried whether a user of the system 20 has requested categorical detail, possibly regarding some portion of previously entered content data 420 and/or restricted content data 410 received and displayed, for example during step 575. If categorical detail has been requested, the module 500 may, according to certain embodiments, revert to step 545, as previously described herein, displaying a categorical detail panel 1300 or an analogous "pop-up" window, each as may provide additional detailed information for the user concerning the manner in which the entered content data 420 implicates one or more trigger terms with data 430.

Remaining with step 585 momentarily, it should further be understood that, according to various embodiments, the trigger term module 500 may be additionally and/or alternatively configured to prompt the user to answer one or more questions regarding some portion of categorical detail data, as may be defined within at least the restricted content data 410. In this manner, the trigger term module and accompanying system may be configured to internally and proactively seek to remedy and/or mitigate the "triggering" of term data 430 and the generation of restricted data 512. As will be described in further detail later, where internal, automated mitigation, for example via a question and answer format is possible and where such alleviates the "trigger," such may maintain the efficiency and convenience of the shipping request tool, without sacrificing consistency and/or safety. Alternative "question and answer" formats may be envisioned, as commonly known and understood in the art, without departing from the scope and nature of the present invention, provided such are configured to generally collect additional information from a user of the system for the purpose of removing a generated "trigger."

Of course, if during steps 580 and 585, the trigger term module 500 determines according to various embodiments that no input content data 420 has been received for at least a certain period of time (which may be pre-determined according to any of a variety of parameters, as may be desirable for particular applications) and that no categorical detail has been requested by the user of the system 20, the module is configured to proceed to step 590. During step 590, as is illustrated in FIG. 7, the module 500 seeks confirmation from a user that entry of input content data 420 is indeed complete, preventing not only inadvertent confirmation when a customer or user has merely paused entry, but also inadvertent approval and/or further processing of the shipping request without ensuring that any and all restricted data 512 has been captured and appropriately processed. In this manner, it should be understood that the "confirmation process," an exemplary implementation of which may be seen in at least box 1150 of FIG. 10, ensures that prohibited or restricted items aren't inadvertently shipped, subjecting not only the user but also the common carrier service provider to fines and/or civil penalties. Although box 1150 illustrates a confirmation that "no prohibited items exist in this package," alternative confirmations could be envisioned, such that scenarios in which exceptions have been made and/or processed by the system, typically with external assistance from a carrier help desk facility and personnel, as will be described elsewhere herein.

In any event, in any of these and still other embodiments, if a confirmation that no prohibited, restricted, or otherwise unapproved items are in a particular package shipping request, the trigger term module 500 is configured to proceed to step 592, during which confirmation data 516 is generated. The confirmation data 516 is generally data indicative of and/or containing within at least a portion of the confirmation received in step 590. Of course, a variety of configurations of confirmation data 516 may be envisioned without departing the scope and nature of the present invention, provided such is generally configured to ensure an express and proactive (versus passive) approval of the shipping request. As will be described elsewhere herein with respect to the exemplary user interface display screens, in at least some embodiments, receipt of a confirmation and/or generation of confirmation data 516 may be a prerequisite for further processing of a particular shipping request, as may also be understood from at least FIG. 10.

Returning now to FIG. 7, upon receipt of a confirmation in step 590 and generation of confirmation data 516 in step 592, the trigger term module 500 is configured according to various embodiments to proceed to step 595, wherein at least the confirmation data 516 is transmitted to the report module 600. In certain embodiments, as may be understood from FIG. 5, various portions of the shipment data 440 and/or the restricted data 512, which may itself include further portions of the restricted content data 410, the input content data 420, and the trigger term data 430 may likewise be transmitted via step 595 to the report module. Of course, it should be understood that in other embodiments, only indications of such additionally relevant or pertinent data, as contained within the data module 400 may be transmitted via 595, leaving the report module 600 to further retrieve such data directly from the data module, as may be desirable for certain applications.

Reverting momentarily to step 555 of FIG. 7, as executed by the trigger term module 500, if contrary to as has been described previously herein with the module identifying one or more implicated trigger terms and proceeding via step 565, where no trigger terms are implicated based upon the presently entered input content data 420, the module is configured according to various embodiments to proceed instead to step 560. During step 560, the module 500 and in particular the tool 510 therein is configured to generate unrestricted data 514, which may be nothing more than an indication and/or annotation of the entered content data 420 as not having any prohibited or restricted items associated therewith.

Upon generation of unrestricted data 514 in step 560 in this manner, the trigger term module 500 may be configured according to various embodiments to proceed to step 562, during which the module queries whether entry of data (e.g., content data 420) is complete. If so, the module 500 may be configured to proceed to step 590, during and after which the confirmation processes (see also steps 592 and 595) occur, as previously described herein. If not, the module 500 is configured to proceed instead to step 542, also as previously described herein, whereby the module awaits receipt of additional data entry, whether that be further input content data 420 (in which case the trigger term tool 510 would be configured according to various embodiments to dynamically and/or iteratively "scrub" entered terms against trigger terms) or shipment data 440 (in which case the "browsing" or categorical overview panel 1200 may be provided to a user, as may be desirable for particular applications).

In any of these and still other embodiments, it should, however, be understood that the trigger term module 500 and the trigger term tool 510 contained therein provides two interrelated features, namely a "browsing" capability, wherein users may assess whether what they may desire to ship could potentially implicate one or more categories of items, via an exemplary categorical overview panel 1200 (see FIG. 10), and a "scrubbing" capability, wherein users may receive a dynamically updated indication of whether entered text, describing the content of desired shipments, implicates one or more terms associated (directly and/or indirectly) with restricted and/or prohibited items. In this manner, the trigger term module 500 and the automated tool 510 contained therein provide an improved shipping request system 20 that ensures that prohibited and/or restricted items in packages for which shipment is sought are consistently, efficiently, and accurately identified and dealt with, without unduly sacrificing customer convenience, service, and/or safety.

Report Module 600

With reference to FIG. 8, according to various embodiments, the report module 600 is configured to generally receive various types of data from either the data module 400 or the trigger term module 500 and perform further processing steps based thereon. Beginning with step 630, the report module 600 may be configured to query whether any items of data (e.g., restricted data 512, unrestricted data 514, and/or confirmation data 516, any of which may further comprise portions of restricted content data 410, input content data 420, trigger term data 430, and/or shipment data 440) have been received by the report module. If no data has been received, the report module 600 is configured according to various embodiments to proceed to step 635, wherein the module stands by to receive one or more pieces of data. In certain embodiments, the report module 600 may simply passively await receipt of data during step 635, while in other embodiments, the report module 600 may at least periodically (e.g., as pre-determined by one or more users of the system 20) actively query one or more of the modules 400-500 for data, as may be desirable for particular applications. Of course, any of a variety of data calling and/or transmission configurations may be envisioned, without departing from the scope and nature of the present invention.

Remaining with FIG. 8, upon receipt of data in step 630, various embodiments of the report module 600 are configured to proceed to step 640, during which the specific type of data received is determined. If restricted data 512 is identified within step 650, the module 600 is configured according to various embodiments to, in step 654 execute a restriction tool 610. In certain embodiments, the restriction tool 610 is configured to generate one or more restriction transmittals 612, which are based at least in part upon receipt of the restricted data 512. The restriction transmittals 612 may take any of a variety of forms, including the non-limiting examples of reports, notifications (e.g., via email, text, or otherwise), and/or alerts (e.g., audible, textual, graphical, visual, or otherwise), each as may be desirable for particular application. An exemplary, non-limiting example of a restriction transmittal 612 may be seen in FIG. 15, wherein field 1410 indicates a textual alert that "[t]he entered description may indicate the presence of prohibited items," as generated upon user entry of input content data 420 comprising the terms "laptop" and "cash." Such exemplary user interfaces and displays will be described in further detail elsewhere herein.

Returning to FIG. 8, if during execution of step 640, the report module determines that unrestricted data 514 has been received (see step 660), the module 600 is configured to proceed to step 680, wherein the module executes a shipment tool 620. As may be best understood, where unrestricted data 514 is received, such is indicative that no prohibited items were identified within the package for which shipment is requested. In certain embodiments, for example, those not requiring further confirmation data, as may be desirable for certain applications, the unrestricted data 514 may be used by the report module 600 as a basis for generating one or more shipment transmittals 622 via the shipment tool 620 (see step 690). Of course, in certain embodiments, although unrestricted data 514 may be indicative of an absence of prohibited and/or restricted items in and of itself, the shipment tool 620 may be configured to further await receipt of confirmation data 516 prior to permitting continued processing of the shipment request toward approval, as will be described in further detail below.

Indeed, if during execution of step 640, the report module determines that confirmation data 516 has been received (see step 670), it may likewise be configured to proceed to execute shipment tool 620. It should be understood that confirmation data 516 may accompany either unrestricted data 514 or restricted data 512, as has been previously described herein, and as such the restriction transmittals 612 of step 658 should be considered "preliminary alerts" of a sense, whereas execution of the shipment tool 620 occurs at some point thereafter, generally according to certain embodiments once entry of input content data 420 is complete and/or a confirmation thereof, along with any associated confirmation data 516, as may be generated by the trigger term module 500 has been received at the report module 600. In this manner, in at least some embodiments (see, for example FIG. 5), the restriction tool 610 and the shipment tool 620 may be executed sequentially; of course, in other embodiments (see, for example, FIG. 8), their execution may be generally distinct.

With continued reference to FIG. 8 and still further to FIGS. 21 and 22, it should be understood that according to various embodiments, the shipment transmittals 622 may comprise any of a variety of reports, charts, alerts, notifications, and/or user interface displays that may be associated with and/or indicative of a finalization of the shipping request initiated by a user of the system 20. FIG. 21 illustrates an exemplary review and finalization screen display 1500, which may comprise at least a portion of the shipment transmittals 622 generated by the shipment tool 620. As will be described elsewhere herein, a user may, via display 1500 ensure that all selected parameters are accurate and complete, prior to navigating to a display, such as the exemplary reporting screen display 1600 of FIG. 22.

It should be understood that any of a variety of features and/or components may be generated, as within the scope of the shipment transmittals 622 of FIG. 8. Indeed, as a non-limiting example, the transmittals 622 may include generation and provision to a user of a populated shipping label, based at least in part upon the shipment data 440 and the input content data 420 processed by the system 20. In at least one embodiment, the shipping label may include further indicia of confirmation data 516, providing assurances that the shipment has been assessed with the improved trigger term tool 510 and associated system 20, as described herein-throughout.

Exemplary User Interface(s) & Methods of Using the Same

Turning now to FIGS. 9-22, such illustrate various exemplary user interface screen displays that may be generated by the system 20 and its associated modules 400-600 during execution of various ones of the steps previously described herein. These exemplary user interface screen displays will now be described, in turn, with reference to a non-limiting example, wherein a customer named Caroline turns to the system 20 for submittal and handling of a shipping request for transport of a package via a large scale transportation network.

With reference to FIG. 9, which is a view of an exemplary service selection screen display 1000 of an exemplary user interface of the shipping request system 20 according to various embodiments, it should be understood that upon accessing the system, Caroline may be first presented with the display 1000 for purposes of collecting certain pieces of shipment data 440. In certain embodiments, certain portions of shipment data 440, such as service type, may determine, at least in part, those restrictions to which the package contents are subjected. Caroline is offered, via field portion 1010 the ability to sort the available service options based upon one or more preferences that might best mirror her shipping parameters, for example sorting by fastest delivery, considering she would like the package shipped no later than October 3.

Remaining with FIG. 9, an exemplary service selection field 1020 may be populated with additional portions of shipment data 440 that may be contained with the data module 400, namely those portions populated by, for example, a common carrier shipment provider associated with the system 20. Various options available from the provider may be displayed in the service selection field 1020, which may be a scrollable panel, depending upon the number of service options available. In the continuing non-limiting example, with Caroline desiring delivery no later than October 3, any of the first four options displayed in FIG. 9 would be acceptable.

Upon selection of, for example, the $2^{nd}$ Day Air option, guaranteeing delivery by October 3 for $43.26, Caroline may navigate forward via the one or more navigation buttons (e.g., back, next, and the like) located in a navigation portion 1090 of the exemplary screen display 1000. Such navigation fields are commonly known and understood in the art and as such, will not be described in further detail for purposes of the present invention. In related vein, it should be further understood from FIG. 9 that Caroline may access assistance via a "Help" menu 1080, which may entail an integrated "Help Tool" within the system 20, an external common carrier provider populated Help Center, a combination thereof, and the like, as is also generally understood in the art of providing customer/user interfaces for service-related applications and software tools.

Upon selection of a particular service option on screen display 1000, the system may be configured to display the exemplary content selection screen display 1100 of FIG. 10. For example, once Caroline selects $2^{nd}$ Day Air transport of her package(s), the display 1100 may appear for her review, according to various embodiments. As may be seen from FIG. 10, the display 1100 may include a data entry field 1110, a categorical overview panel 1200, a help link 1180, a navigation portion 1190, and a confirmation portion 1150. Generally speaking, Caroline may enter input content data 420, as previously described herein to include descriptive terms associated with the contents or items for which shipment is sought. Prior to entry of such, however, in certain embodiments, the categorical overview panel 1200 may provide a "browsing" capability, whereby Caroline may peruse various categorical restriction fields 1210, as may be applicable based at least in part upon her service option selection. For example, as may be seen from FIG. 11, the firearms and ammunition 419 category may be implicated due to "air transport," whereas had ground transport been selected, such may not have been or may have been differently implicated and thus displayed.

Returning to FIG. 10, it may be seen that by browsing the categorical overview panel 1200, Caroline may review a plurality of categorical restrictions. Although nine categories are displayed in the illustrated embodiment, it should be understood that additional categories may exist and be available for display, via for example a scrolling bar 1250, as such is commonly known and understood in the art. Should Caroline desire additional information concerning a particular category, for example on the shipment of alcoholic beverages 411, she may, in certain embodiments, click on a "More Information" link 1220, in response to which a new window, in pop-up style or otherwise, may appear (see 1225 of FIGS. 10 and 11).

Consider a handful of non-limiting examples. With reference specifically to FIG. 10, Caroline may want to ship a bottle of wine to her sister Catherine and learn that no alcoholic beverages, including wine, beer, and liquor may be shipped. With reference momentarily to FIG. 11, should Caroline desire alternatively to ship fireworks to her brother Patrick, the system may inform her that such is not permitted. If instead Caroline wishes to send her old laptop as a gift to her other sister Victoria, she would learn from browsing that batteries might be restricted in some manner, whereby according to certain embodiments, she could be presented with an additional "More Information" link 1228, which would direct her to a categorical detail display 1300, as previously described herein. FIG. 12 illustrates an exemplary categorical detail display 1300, with distinct fields therein providing details for what "You may Not Ship" 1310, what "You May Ship" 1320, and still further link(s) to "Complete Guide(s)" 1330 for the particular detail requested. It should be understood that the categorical detail display 1300 may further include an option for requesting help, for example via an externally staffed help center, perhaps provided by the common carrier shipment provider, via which Caroline may also seek assistance and/or guidance. Still further, the fields 1310, 1320 may further include both textual and graphical guidance features, as may be seen in FIG. 12. A navigation portion 1390 may also be provided, which in at least the illustrated embodiment comprises a "Done" button, which Caroline may select upon completion of her review of the screen 1300.

Turning now to FIG. 13, it should be understood that the "browsing" capability of the categorical overview panel 1200, as previously described herein, may generally precede entry of input content data 420. Of course, as should be understood from field 1170 of FIG. 19, the categorical overview panel 1200 may be viewed via a "toggle" feature according to certain embodiments, whereby even upon entry of input content data 420, Caroline may "toggle" between views of either the categorical overview panel 1200 or the trigger term panel 1400, as will be described further below.

Remaining with FIG. 13, several safeguards within various embodiments of the system 20 may be understood. Particularly, at least the "Next" button of the navigator portion 1190 may be disabled prior to entry of input content data 420 and selection of a confirmation box 1150, which may be configured according to various embodiments to generate the confirmation data 516, as previously described herein. In this manner, the trigger term tool 510 of the system 20 ensures that no shipping requests are inadvertently approved and/or further processed without at least a descriptive entry of contents and confirmation that no prohibited or restricted items are in the package for shipment.

Turning now to FIG. 14, continuing with our non-limiting example, whereby as Caroline begins entry of input content data 420 in field 1110, the display 1100 changes from the categorical overview panel 1200 to the trigger term panel 1400, as one or more trigger terms are "triggered." In at least the illustrated scenario, upon entry by Caroline of the term "laptop," the trigger term panel 1400 appears according to certain embodiments, with prepopulated fields associated with restrictions and/or prohibitions that are implicated simply by entry of the term "laptop." As may be seen, in field 1420 any combination of textual and/or graphical data may be displayed, including one or more links 1425 that may provide "More Information" should Caroline need such. Such links 1425 may be substantially comparable to those previously described herein (see, for example, link 1220 of at least FIG. 11). Caroline may be additionally and/or alternatively prompted by the system to answer one or more questions regarding the entered input content data 420, with the goal being to internally and automatically (e.g., via the system) mitigate any issues and/or eliminate the "triggered" term. For example, the system may be configured to prompt, where the term "battery" has not itself been textually entered to ask if the batteries within the device described will be removed prior to shipment (e.g., "Will the laptop batteries be removed prior to shipment?"). If so, the trigger/alert may be resolved and/or removed. If not and such and/or additional questions prove unsuccessful or leave a certain degree of (perhaps predetermined) uncertainty of lack of clarity, external help, as previously described herein may also be provided and/or requested, for example via link 1180, prior to finalization and approval of the shipping request. In certain embodiment, a text field 1240 may be provided in association with the categorical overview display panel 1200 indicating the availability of assistance; in at least one embodiment, the field 1240 may provide a disclaimer that the illustrated listing is not a comprehensive listing, but just a general guide (see specifically FIG. 10).

Returning now to FIG. 14, it should also be understood that upon entry of the term "laptop," the system 20 according to various embodiments may further generate one or more alerts in field 1410, notifying Caroline that "[t]he entered description may indicate the presence of prohibited items." One or more additional alerts and/or notifications may also be provided to personnel monitoring the entry of data upon the system 20, as should generally be understood with reference to step 570 of FIG. 7 and further operation of the report module 600 in FIG. 8, all as has been previously described herein. Further described by FIG. 14, it should be understood that the one or more alerts, notifications, and the like, generated (automatically or otherwise) upon entry of text triggering a "trigger term" within the data module 400, a user such as Caroline may receive not only the visual indicator in field 1410 but also an audible chime. Additional and/or alternative "alert" or alarm configurations may be envisioned, without departing from the scope and nature of the present invention.

Turning now to FIGS. 15 and 16 in conjunction, Caroline's continued entry of input content data 420 in field 1110 illustrates the manner in which the trigger term tool 510 of the trigger term module 500 (described previously herein) dynamically monitors the entry of data to "scrub" for potentially prohibited and/or restricted items. FIG. 15 in particular indicates the generation of an additional alert in field 1410 as the term "cash" in field 1110 implicates the category of money and negotiable items 418 (see also FIG. 13). As may be understood from this Figure, multiple "implicated term" fields 1420, 1430 may be generated in a dynamic fashion based upon text entered in field 1110. In certain embodiments, the dynamic monitoring may be on a keystroke basis, wherein entry of "ca" even could implicate the money and negotiable term category. In other embodiments, entry of "c" could dynamically implicate money and negotiable terms (e.g., cash) while also implicating dangerous goods (cologne—see FIG. 11), whereupon after entry of "ca" the implication of dangerous goods would be removed (i.e., field 1430 or a comparable field would be removed from display panel 1400.

This may be further understood with reference to FIG. 16, as compared to FIG. 15. As mentioned, entry of "cash" in field 1110 implicated the related category "money and negotiable items." However, should Caroline continue typing beyond "cash" to describe in field 1110 a "cashmere sweater," the implication of the term "cash" and/or its related category would be removed from panel 1400. This dynamic monitoring, achieved via the automated trigger term tool 510 monitors not only keystroke entries, but in certain embodiments may also measure Caroline's typing speed, such that the speed of updates to the display panel 1400 are adjusted to correspond substantially therewith accordingly.

Turning now to FIG. 17 and continuing with our non-limiting example, we can see how further to entering her desired shipment of a cashmere sweater to her mother Sarah, Caroline has further described a desired shipment of nail polish to her grandma Cathy. However, as may be seen in trigger term panel 1400, the system 20 according to various embodiments generates an alert in field 1410 (textual and/or audible, or otherwise) that an additional trigger term "nail polish" has been implicated. Field 1440 describes this additionally implicated parameter, much as described in fields 1420 and 1430 where the terms laptop (related to batteries and thus dangerous goods 416) and cash (related to money and negotiable terms 418). As may be seen, general descriptive information is provided; however, according to various embodiments, Caroline may be further able to "toggle" between views of the trigger term panel 1400 with its various alerts and notices to the categorical overview panel 1200. Such may be possible via the exemplary "toggle" button 1170, although in certain embodiments, certain portions of the fields 1420-1440 may be themselves selectable, thus enabling a "toggling" between them and, for example, associated categorical details within panel 1300. Any of a variety of interrelated screens and links may of course be envisioned, as such are commonly known and understood in the art.

With reference to FIG. 18, it should be understood that even upon "toggling" to views or displays other than the trigger term panel 1400, Caroline and/or other exemplary users may continue to enter input content data 420 in field 1110. The field 1110 may be further erased or cleared, whether via use of a "Backspace" button on the keyboard of an associated device or via button 1160. In certain embodiments, if additional terms are "triggered," the system 20 may be configured to automatically toggle back to the panel 1400. In other embodiments, a textual, visual, audible, or other variation of an alert message may be displayed, in response to which Caroline may, as the user, return toggle back to the panel 1400 to further assess various information and parameters surrounding the newly implicated trigger term(s).

Using FIG. 19 as an example, should Caroline further enter the term "amunition," the display panel 1400 could according to various embodiments reappear, further populated with related category data 1450 concerning "firearms and ammunition" 419 (see FIG. 18), as may be implicated by entry of the term "amunition" 1452 (see FIG. 20). It should be understood in this regard, that beyond identifying matches between terms and categorical items, various embodiment are further configured to identify related item terms and still further common misspellings thereof. In this manner, the trigger term tool 510 provides an improved degree of consistency and accuracy, greatly diminishing the occurrence of inadvertent and/or erroneous processed and approved shipments containing prohibited and/or restricted items.

Turning now to FIG. 20, as previously mentioned herein, various safeguards exist within the system 20 such that further processing and/or approval of a shipping request may not continue until input content data 420 is entered in field 1110 and box 1150 is checked to confirm that there are no prohibited items in the request, which in turn generates confirmation data 516 associated therewith, as previously described herein. In certain embodiments, only after these two steps have been completed will the system 20 permit further processing by the report module 600, which may include finalization of the shipping request, perhaps even generating a shipping label for the desired package. In at least the illustrated embodiment of FIG. 20, the "Next" button 1192 within the navigation portion 1190 of the display 1100 may only be activated (and thus selectable) upon entry of data in field 1110 and checking of confirmation box 1150 by the user (see also FIG. 19, for illustration of the deactivated "Next" button).

Indeed, with brief reference to FIGS. 21 and 22, it should be understood that upon Caroline confirming that her entry of input content data 420 was complete and that there were no prohibited items within her shipment (whether attained by not entering any triggered terms and/or by removing triggered term items when so prompted), the system 20 may proceed to display a review and finalization screen display 1500, whereby the report module 600 may be configured to retrieve additional shipment data 440 from the data module 400 for display and confirmation of accuracy and completeness. Payment information may also be processed, with completion of the shipping request, as illustrated in FIG. 22, occurring upon confirmation of payment on screen display 1600.

In certain embodiments, as evident from FIG. 22, the reporting screen display 1600 may further indicate that an associated shipping label is being printed in accordance with the shipping request. Additional instructions may also be provided on this reporting screen, as may be desirable and/or necessary for particular applications. Of course, in certain embodiments, any of a variety of additional alerts, notification, and/or reports may be generated in conjunction with display of screen display 1600, whether via mail, email, text, or otherwise, all as should generally be commonly known and understood in the art for finalizing and documenting a financial transaction entered between a service provider and an exemplary customer.

With regard to the shipping label being printed in accordance with finalizing and further processing the shipping request, it should be further understood that the label may contain one or more indicators thereon that it has been processed via the system described elsewhere herein. For example, in at least one embodiment, the label may state that "No prohibited items were identified during the processing of this package for shipment." In other embodiments, any of a variety of indicia, whether human- or machine-readable in form, may be envisioned, as such are commonly known and understood in the art.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shipping request system comprising a user interface that dynamically displays, in response to input content data, one or more restricted items potentially identified within shipping requests for transport of one or more packages via a common carrier service provider, said system comprising:

one or more memory storage areas containing restricted content data that identifies restricted items associated with one or more restrictions placed upon contents of package shipments handled by said common carrier service provider, and trigger data associated with one or more terms related to said one or more restrictions, wherein the trigger data comprises correlations between content data and trigger data indicative of the restricted items; and one or more computer processors configured to:

provide within a first input interface window an input content data portion that receives user input content data;

provide within the user interface a trigger term panel configured to dynamically display a portion of the restricted items;

(A) receive, via the first input interface window and from a user of said shipping request system, input content data comprising one or more terms descriptive of one or more items for which shipment is requested via said common carrier service provider;

(B) retrieve said trigger data from said one or more memory storage areas;

(C) dynamically scrub, on an individual keystroke basis, said input content data against said retrieved trigger data to identify one or more correlations there-between, said one or more correlations being indicative of a potential presence of one or more restricted items;

(D) based at least in part upon said dynamic scrubbing and further:

i. responsive to said one or more identified correlations directly matching and identifying one or more restricted items, automatically and dynamically generate and automatically and dynamically update, via the trigger term panel, a consolidated display of selectable information related to said one or more identified correlations and identifying said one or more restricted items wherein said selectable information of said consolidated display is automatically updated at a rate complementary to a measured rate at which said input content data is being received on said individual keystroke basis, wherein said selectable information comprises a textual and graphical identification of said one or more restricted items, an identification of one or more categories of items related to said one or more restricted items, and a brief description of one or more restrictions placed upon said one or more restricted items, wherein said selectable information is all generated and updated on said trigger term panel alongside said input content data and viewable by said user of said shipping request system during ongoing entry of said input content data on said individual keystroke basis; and ii. responsive to said one or more identified correlations not directly matching or identifying said one or more restricted items, automatically and dynamically generate, in the first input interface window, a query-based prompt requiring user input prior to receipt of further input content data on said individual keystroke basis;

(E) responsive to an interactive user selection of a portion of said displayed selectable information associated with said one or more restricted items or receipt of an interactive user input responsive to the query-based prompt, whereby the user selection or the user input directly matches and identifies said one or more restricted items:
  i. generate one or more notifications indicative of potential presence of one or more restricted items within said shipping request, said one or more notifications being configured to prompt additional user confirmation, via the first input interface window, that no restricted items are actually present and to prevent further processing of said shipment request pending said user confirmation;
  ii. in response to receiving said additional user confirmation, activate a previously un-selectable component of said consolidated display; and
  iii. responsive to an interactive user selection via the first input interface window, of said activated component, generate a physical and customized shipping label for placement upon said one or more packages by said customer, said customized shipping label containing a combination of human- and machine-readable indicia containing confirmation data associated with said received user confirmation, said confirmation data on the customized shipping label providing a visual assurance that said one or more packages have been successfully processed via the shipping request system;
and (F) responsive to not identifying one or more correlations or receiving a user input responsive to the query that does not directly identify said one or more restricted items, generate one or more instructions configured to automatically initiate further processing of said shipment request without requiring further user confirmation.

2. The system of claim 1, wherein said one or more correlations comprise at least one of a direct term match, a partial term match, a categorical association, and one or more common misspellings of said input content data.

3. The system of claim 2, wherein said categorical associations are selected from a group consisting of alcoholic beverages, tobacco products, animal skins and furs, perishable goods, dangerous goods, plants and seeds, money and negotiable items, and firearms and ammunition.

4. The system of claim 3, wherein said input content data comprises at least the term "laptop" and said categorical associations comprise "batteries" as a dangerous good.

5. The system of claim 1, wherein said one or more notifications comprises an alert of the presence of one or more restricted items.

6. The system of claim 5, wherein said alert is at least one of a textual alert, an audible alert, or a visual alert.

7. The system of claim 5, wherein said one or more notifications further comprise a display of information related to one or more categories associated with said one or more restricted items indicated by said one or more correlations.

8. The system of claim 1, wherein said trigger data is dynamically updated to reflect a correspondingly dynamic set of regulations associated with the transport of one or more packages via said common carrier service provider.

9. The system of claim 1, wherein in response to not identifying said one or more correlations, said one or more computer processors are configured to request confirmation that entry of input content data is complete prior to automatically facilitating further processing of said shipment request.

10. The system of claim 9, wherein upon receipt of said confirmation, said one or more computer processors are further configured to generate one or more notifications for transmittal to one or more users of said system.

11. The system of claim 10, wherein at least one of said one or more notifications comprises a shipping label for said one or more packages associated with said shipping request.

12. The system of claim 1, wherein said one or more computer processors are configured to prevent further processing of said shipment request until input content data has been received and the existence of no correlations has been confirmed by a user of the system.

13. The system of claim 1, wherein:
said one or more memory storage areas contain shipping service data associated with one or more types of shipping services available via said common carrier service provider; and
said one or more computer processors are configured to retrieve only a portion of said trigger data, said portion being that which is further associated with a type of shipping service selected by a user of said system.

14. A non-transitory computer program product comprising at least one computer-readable storage medium having computer-readable program code portions embodied therein, the computer-readable program code portions comprising one or more executable portions configured to perform a method of providing a user interface configured to dynamically display, in response to input content data, restricted items potentially identified within shipping requests for transport of one or more packages via a common carrier service provider, said method comprising the steps of:
(A) receiving and retrieving a plurality of data, wherein said data comprises:
  (i) restricted content data associated with one or more restrictions placed upon package shipments handled by a common carrier service provider; and
  (ii) trigger data associated with one or more terms related to said one or more restrictions;
(B) providing within a first input interface window an input content data portion that receives user input content data;
(C) dynamically scrubbing, on an individual keystroke basis, input content data against said retrieved trigger data to identify one or more correlations there-between, said one or more correlations being indicative of a potential presence of one or more restricted items, said input content data comprising one or more terms descriptive of one or more items for which shipment is requested via said common carrier service provider, said input content data being received via the first input interface window and from a user of a shipping request system configured for processing transport said package shipments handled by said common carrier service provider; and
(D) based at least in part upon said dynamic scrubbing and further:
  (i) responsive to said one or more identified correlations directly matching and identifying one or more restricted items, automatically and dynamically generating and automatically and dynamically updating, via the first input interface window, a consolidated display of selectable information related to said one or more identified correlations and identifying one or more restricted items wherein said selectable information of said consolidated display is automatically updated at a rate complementary to a measured rate at which said input content data is being received on said individual keystroke basis, wherein said selectable information comprises a textual and graphical identification of said one or more restricted items, an identification of one or more categories of items related to said one or more restricted items, and a brief description of one or more restrictions placed upon said one or more restricted items, wherein said selectable information is all generated and updated on said first input interface window alongside said input content data, wherein said selectable information is viewable by said user of said shipping request system during ongoing entry of said input content data on said individual keystroke basis; and (ii) responsive to said one or more identified correlations not directly matching or identifying said one or more restricted items, automatically and dynamically generate, in the first input interface window, a query-based prompt requiring user input prior to receipt of further input content data on said individual keystroke basis;

(E) responsive to an interactive user selection of a portion of said displayed selectable information associated with said one or more restricted items or receipt of an interactive user input responsive to the query-based prompt, whereby the user selection or the user input directly matches and identifies said one or more restricted items:

(i) generating one or more notifications indicative of potential presence of one or more restricted items within said shipping request, said one or more notifications being configured to prompt additional user confirmation, via the first input interface window, that no restricted items are actually present and to prevent further processing of said shipment request pending said user confirmation;

(ii) in response to receiving said additional user confirmation, activating a previously un-selectable component of said consolidated display; and (iii) responsive to an interactive user selection, via the first input interface window, of said activated component, generating a physical and customized shipping label for placement upon said one or more packages by said customer, said customized shipping label containing a combination of human- and machine-readable indicia containing confirmation data associated with said received user confirmation, said confirmation data on the customized shipping label providing a visual assurance that said one or more packages have been successfully processed via the shipping request system; and (F) responsive to not identifying one or more correlations or receiving a user input responsive to the query that does not directly identify said one or more restricted items, generating one or more instructions configured to automatically initiate further processing of said shipment request without requiring further user confirmation.

15. The non-transitory computer program product of claim 14, wherein:

said third executable portion is further configured to dynamically generate one or more notifications in response to identifying said one or more correlations.

16. The non-transitory computer program product of claim 15, wherein said one or more correlations comprise at least one of a direct term match, a partial term match, a categorical association, and one or more common misspellings of said input content data.

17. The non-transitory computer program product of claim 16, wherein:

said display of information is based at least in part upon said one or more correlations comprising a categorical association with said trigger data; and said display of information comprises a categorically-formatted display of at least a portion of said restricted content data related to one or more restricted items associated with said one or more correlations.

18. The non-transitory computer program product of claim 14, wherein said third executable portion is further configured for preventing further processing of said shipment request pending receipt of confirmation data, said confirmation data comprising at least one of an indication that no restricted items have been identified as existing within said one or more packages for which shipment via said common carrier service provider is requested and an indication that any identified restricted items have been removed from including within said one or more packages for which shipment via said common carrier service provider is requested.

19. The non-transitory computer program product of claim 18, wherein said third executable portion is further configured for preventing further processing of said shipment request until at least a portion of input content data has been received.

20. The non-transitory computer program product of claim 14, wherein said third executable portion is further configured for facilitating further processing of said shipment request by, at least in part, generating at least one shipment label for said one or more packages for which shipment via said common carrier service provider is requested, said shipment label comprising an indication thereon that no restricted items have been identified therewithin.

21. A computer-implemented method for providing a user interface that dynamically displays, in response to input content data, one or more restricted items potentially identified within shipping requests for transport of one or more packages via a common carrier service provider, said method comprising the steps of:

(A) receiving and storing within one or more memory storage areas trigger data associated with one or more terms related to one or more restrictions placed upon contents of package shipments handled by said common carrier service provider;

(B) providing within a first input interface window an input content data portion that receives user input content data;

(C) receiving, via the first input interface window and from a user of said shipping request system, input content data comprising one or more terms descriptive of one or more items for which shipment is requested via said common carrier service provider;

(D) dynamically scrubbing, on an individual keystroke basis and via at least one computer processor, said input content data against said retrieved trigger data to identify one or more correlations there-between, said one or more correlations being indicative of a potential presence of one or more restricted items;

(E) based at least in part upon said dynamic scrubbing and further:

i. responsive to said one or more identified correlations directly matching and identifying one or more restricted items, automatically and dynamically generating and automatically and dynamically updating, via said at least one computer processor and the first input interface window, a consolidated display of selectable information related to said one or more identified correlations and identifying one or more restricted items wherein said selectable information of said consolidated display is automatically updated at a rate complementary to a measured rate at which said input content data is being received on said individual keystroke basis, wherein said selectable information comprises a textual and graphical identification of said one or more restricted items, an identification of one or more categories of items related to said one or more restricted items, and a brief description of one or more restrictions placed upon said one or more restricted items, wherein said selectable information is all generated and updated on said first input interface window alongside said input content data, wherein said selectable information is viewable by said user of said shipping request system during ongoing entry of said input content data on said individual keystroke basis; and ii. responsive to said one or more identified correlations not directly matching or identifying said one or more restricted items, automatically and dynamically generating, via the at least one computer processor and within the first input interface window, a query-based prompt requiring user input prior to receipt of further input content data on said individual keystroke basis;

(F) responsive to an interactive user selection of a portion of said displayed selectable information associated with said one or more restricted items or receipt of an interactive user input responsive to the query-based prompt, whereby the user selection or the user input directly matches and identifies said one or more restricted items:

i. generating one or more notifications indicative of potential presence of one or more restricted items within said shipping request, said one or more notifications being configured to prompt additional user confirmation, via the first input interface window, that no restricted items are actually present and to prevent further processing of said shipment request pending said user confirmation;

ii. in response to receiving said additional user confirmation, activating a previously un-selectable component of said consolidated display; and iii. responsive to an interactive user selection, via the first input interface window, of said activated component, generating, via said one or more computer processors, a physical and customized shipping label for placement upon said one or more packages by said customer, said customized shipping label containing a combination of human- and machine-readable indicia containing confirmation data associated with said received user confirmation, said confirmation data on the customized shipping label providing a visual assurance that said one or more packages have been successfully processed via the shipping request system; and (G) responsive to not identifying one or more correlations or receiving a user input responsive to the query that does not directly identify said one or more restricted items, generating one or more instructions configured to automatically initiate further processing of said shipment request without requiring further user confirmation.

22. The computer-implemented method of claim 21, further comprising the steps of:

receiving and storing within one or more memory storage areas restricted content data associated with said one or more restrictions placed upon contents of package shipments handled by said common carrier service provider; and in response to identifying one or more correlations, generating a display providing to a user at least a portion of said restricted content data, said portion being that which is categorically associated with said one or more trigger terms for which said one or more correlations are identified.

23. The computer-implemented method of claim 21, further comprising the step of facilitating further processing of said shipping request only upon receipt of input content data and at least one of a confirmation that at least one of no correlations were identified and a confirmation that any identified correlations have been resolved.

* * * * *

UNITED STATES PATENT AND TRADEMARK OFFICE
CERTIFICATE OF CORRECTION

PATENT NO. : 10,325,239 B2
APPLICATION NO. : 13/788156
DATED : June 18, 2019
INVENTOR(S) : Lawrence Gittleman Page 1 of 1

It is certified that error appears in the above-identified patent and that said Letters Patent is hereby corrected as shown below:

On the Title Page

Page 2 Column 02 (Other Publications), Line 18: Please insert --Final Office Action received for U.S. Patent Application No. 14/931,218, mailed on April 16, 2019.--.

In the Specification

Column 04, Line 21: After "5;" delete "a".
Column 17, Line 17: After "510" insert --.--.

Signed and Sealed this
Twentieth Day of August, 2019

Andrei Iancu
*Director of the United States Patent and Trademark Office*